US012021313B2

(12) United States Patent
Morita

(10) Patent No.: US 12,021,313 B2
(45) Date of Patent: Jun. 25, 2024

(54) ANTENNA DEVICE

(71) Applicant: SONY SEMICONDUCTOR SOLUTIONS CORPORATION, Kanagawa (JP)

(72) Inventor: Shinya Morita, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 108 days.

(21) Appl. No.: 17/753,745

(22) PCT Filed: Jul. 21, 2020

(86) PCT No.: PCT/JP2020/028198
§ 371 (c)(1),
(2) Date: Mar. 14, 2022

(87) PCT Pub. No.: WO2021/059704
PCT Pub. Date: Apr. 1, 2021

(65) Prior Publication Data

US 2022/0320730 A1 Oct. 6, 2022

(30) Foreign Application Priority Data

Sep. 25, 2019 (JP) ................................ 2019-173675

(51) Int. Cl.
*H01Q 3/34* (2006.01)
*H01P 5/16* (2006.01)
(Continued)

(52) U.S. Cl.
CPC ................ *H01Q 3/34* (2013.01); *H01P 5/16* (2013.01); *H01Q 5/50* (2015.01); *H01Q 13/08* (2013.01)

(58) Field of Classification Search
CPC .......... H01Q 3/24; H01Q 3/26; H01Q 3/2658; H01Q 3/40; H01Q 3/34; H01Q 3/36;
(Continued)

(56) References Cited

U.S. PATENT DOCUMENTS 4,989,011 A * 1/1991 Rosen .................... H01Q 25/04 342/373
2004/0242272 A1* 12/2004 Aiken ...................... H01Q 3/40 342/368
(Continued)

FOREIGN PATENT DOCUMENTS

CN 104600437 A 5/2015
EP 3232510 A1 10/2017
(Continued)

OTHER PUBLICATIONS

International Search Report and Written Opinion of PCT Application No. PCT/JP2020/028198, dated Oct. 13, 2020, 09 pages of ISRWO.

*Primary Examiner* — Thai Pham
(74) *Attorney, Agent, or Firm* — CHIP LAW GROUP

(57) ABSTRACT

Provided is an antenna device capable of efficiently transmitting millimeter wave band signals. The antenna device includes plural antennas, a first Butler matrix circuit, and a second Butler matrix circuit. The plural antennas are disposed apart from each other. The first Butler matrix circuit is connected to each of the plural antennas. The second Butler matrix circuit is connected to each of the plural antennas. In each of the plural antennas, a first feed point connected to the first Butler matrix circuit and a second feed point connected to the second Butler matrix circuit are disposed apart from each other.

8 Claims, 23 Drawing Sheets

(51) Int. Cl.
*H01Q 3/40* (2006.01)
*H01Q 5/50* (2015.01)
*H01Q 13/08* (2006.01)

(58) Field of Classification Search
CPC ........ H01Q 21/06; H01Q 21/065; H01Q 1/22; H01Q 1/2283; H01Q 13/08; H01P 5/16
See application file for complete search history.

(56) References Cited

U.S. PATENT DOCUMENTS

| | | | | |
|---|---|---|---|---|
| 2009/0253387 | A1* | 10/2009 | Van Rensburg | H04B 7/10 455/90.2 |
| 2013/0281159 | A1* | 10/2013 | Ai | H01Q 25/00 455/562.1 |
| 2014/0285284 | A1* | 9/2014 | Kim | H01Q 3/40 333/117 |
| 2015/0349421 | A1* | 12/2015 | Sharawi | H01Q 21/0006 342/373 |
| 2017/0301990 | A1* | 10/2017 | Zhao | H01Q 21/296 |

FOREIGN PATENT DOCUMENTS

| | | | |
|---|---|---|---|
| JP | 09-093008 | A | 4/1997 |
| JP | 2004-200869 | A | 7/2004 |
| JP | 2018-500841 | A | 1/2018 |
| KR | 10-2017-0097206 | A | 8/2017 |
| TW | 201929324 | A | 7/2019 |
| WO | 2009/121297 | A1 | 10/2009 |
| WO | 2016/107130 | A1 | 7/2016 |
| WO | 2019/116648 | A1 | 6/2019 |

* cited by examiner

ANTENNA DEVICE

CROSS REFERENCE TO RELATED APPLICATIONS

This application is a U.S. National Phase of International Patent Application No. PCT/JP2020/028198 filed on Jul. 21, 2020, which claims priority benefit of Japanese Patent Application No. JP 2019-173675 filed in the Japan Patent Office on Sep. 25, 2019. Each of the above-referenced applications is hereby incorporated herein by reference in its entirety.

TECHNICAL FIELD

The present disclosure relates to an antenna device.

BACKGROUND ART

There is known an antenna device having Butler matrix circuits that are configured in a single plane (refer, for example, to PTL 1).

CITATION LIST

Patent Literature

[PTL 1]
Japanese Patent Laid-open No. Hei 09-93008

SUMMARY

Technical Problem

The use of millimeter wave band signals is planned to significantly improve the transmission rate of a fifth-generation mobile communication system (5G). When propagating in space, the millimeter wave band signals significantly attenuate. An antenna device capable of efficiently transmitting the millimeter wave band signals is demanded.

The present disclosure has been made in view of the above circumstances. An object of the present disclosure is to provide an antenna device that is capable of efficiently transmitting the millimeter wave band signals.

Solution to Problem

According to an aspect of the present disclosure, there is provided an antenna device including plural antennas that are disposed apart from each other, a first Butler matrix circuit that is connected to each of the plural antennas, and a second Butler matrix circuit that is connected to each of the plural antennas. Each of the plural antennas has a first feed point and a second feed point, the first feed point being connected to the first Butler matrix circuit, the second feed point being connected to the second Butler matrix circuit, the first and second feed points being disposed apart from each other.

The above-described configuration enables the antenna device to use the first feed point as a feed point for a first wave in a millimeter wave band and use the second feed point as a feed point for a second wave in the millimeter wave band. The antenna device is capable of handling two waves in the millimeter wave band, and is thus able to efficiently transmit millimeter wave band signals.

DESCRIPTION OF EMBODIMENTS

Figure 1:
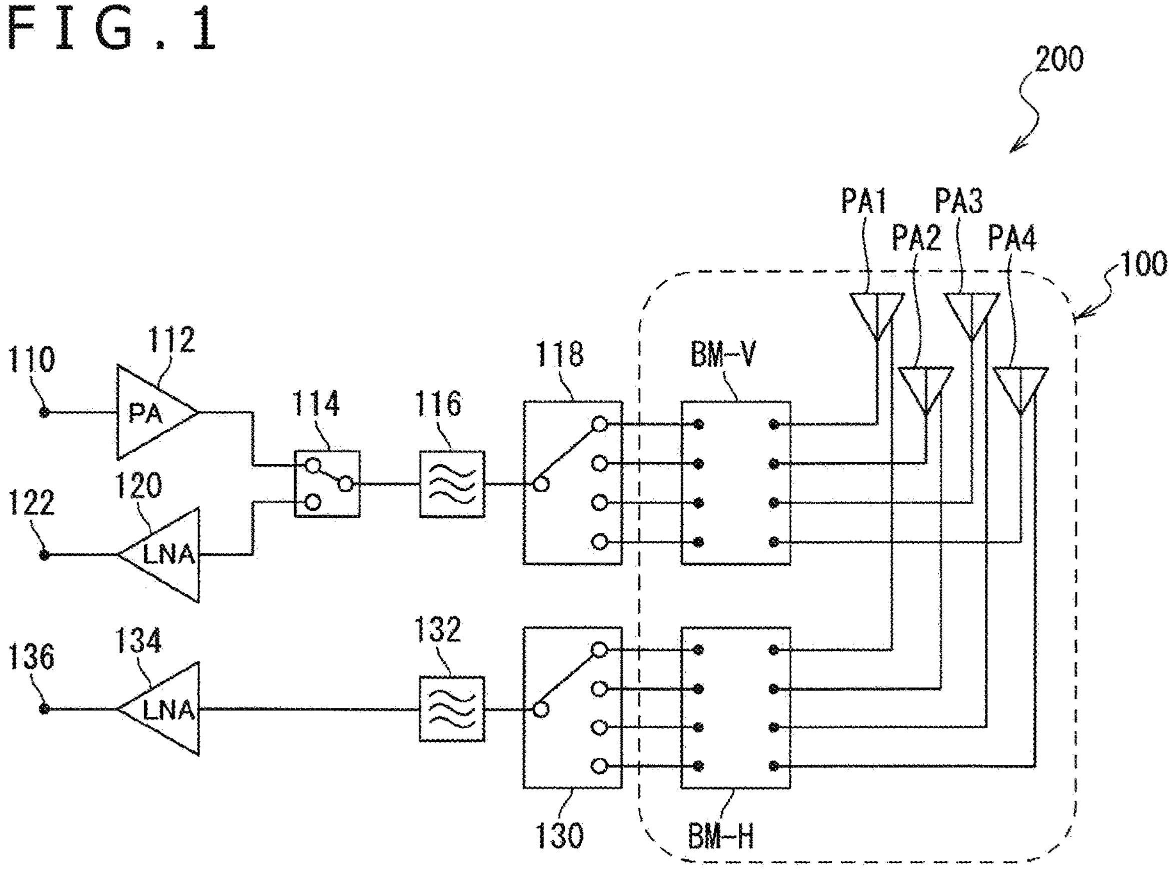
FIG. 1 is a diagram illustrating an example configuration of a phased array antenna device according to a first embodiment of the present disclosure.

Embodiments of the present disclosure will now be described with reference to the accompanying drawings. In the drawings referred to in the following description, components identical or similar to each other are designated by identical or similar reference signs. However, the drawings are schematic. Therefore, it should be noted that, for example, the relation between thicknesses and planar dimensions and the thickness ratio between individual layers are different from real ones. Consequently, the specific thicknesses and dimensions should be determined in consideration of the subsequent description. Further, it is obvious that some parts depicted in the drawings differ from each other in dimensional relation or ratio.

Moreover, definitions of upward, downward, and other directions mentioned in the subsequent description are merely formulated for convenience of explanation, and not intended to limit the technical idea of the present disclosure. For example, it is obvious that, when a target is rotated 90 degrees and observed, an up-down direction is read as a left-right direction, and that, when the target is rotated 180 degrees and observed, the up-down direction is read as a reversed up-down direction.

Furthermore, in the subsequent description, the directions are occasionally described by the wording such as an “X-axis direction,” a “Y-axis direction,” or a “Z-axis direction.” For example, the Z-axis direction indicates the thickness direction of a later-described antenna circuit board 100. The X-axis direction and the Y-axis direction are orthogonal to the Z-axis direction. The X-axis direction, the Y-axis direction, and the Z-axis direction are orthogonal to each other. Additionally, in the subsequent description, the wording “viewed in plan” is equivalent to the wording “viewed in the Z-axis direction.”

First Embodiment

FIG. 1 is a diagram illustrating an example configuration of a phased array antenna device 200 according to a first embodiment of the present disclosure. As illustrated in FIG. 1, the phased array antenna device 200 includes an antenna circuit board 100, an input terminal 110, and output terminals 122 and 136. The input terminal 110 is used to input a signal to the antenna circuit board 100. The output terminals 122 and 136 are used to output a signal from the antenna circuit board 100. Further, the phased array antenna device 200 includes various components disposed in a transmission line for connecting the input terminal 110 (or the output terminal 122) to the antenna circuit board 100, namely, a power amplifier (PA) 112, a single-pole double-throw (SPDT) switch 114, a bandpass filter 116, a single-pole quadruple-throw (SP4T) switch 118, and a low-noise amplifier (LNA) 120. Moreover, the phased array antenna device 200 includes various components disposed in a transmission line for connecting the antenna circuit board 100 to the output terminal 136, namely, a single-pole quadruple-throw (SP4T) switch 130, a bandpass filter 132, and a low-noise amplifier (LNA) 134.

The power amplifier 112 amplifies a signal inputted to the input terminal 110, and outputs the amplified signal to the single-pole double-throw switch 114. The single-pole double-throw switch 114 switches connection between the power amplifier 112 and the bandpass filter 116 and connection between the bandpass filter 116 and the low-noise amplifier 120. The bandpass filters 116 and 132 pass only signals within a specific range of frequencies. An example of the signals within the specific range of frequencies is a millimeter wave band signal. The frequency of the millimeter wave band signal is, for example, 30 GHz or higher and 300 GHz or lower.

The single-pole quadruple-throw switch 118 switches connection between the bandpass filter 116 and four input terminals of a Butler matrix circuit BM-V. The single-pole quadruple-throw switch 130 switches connection between the bandpass filter 132 and four input terminals of a Butler matrix circuit BM-H. The Butler matrix circuits BM-V and BM-H will be described later. The low-noise amplifiers 120 and 134 each amplify a received millimeter wave band signal while inhibiting the addition of noise.

The antenna circuit board 100 includes four patch antennas PA1, PA2, PA3, and PA4 which are disposed apart from each other, the Butler matrix circuit BM-H for horizontal polarization, and the Butler matrix circuit BM-V for vertical polarization. Each of the Butler matrix circuits BM-V and BM-H is of a 4-input 4-output type. The Butler matrix circuits BM-V and BM-H have, for example, the same resonance frequency.

The Butler matrix circuit BM-V is configured such that its four input terminals are respectively connected to four terminals of the single-pole quadruple-throw switch 118 while its four output terminals are respectively connected to the patch antennas PA1, PA2, PA3, and PA4. Similarly, the Butler matrix circuit BM-H is configured such that its four input terminals are respectively connected to four terminals of the single-pole quadruple-throw switch 130 while its four output terminals are respectively connected to the patch antennas PA1, PA2, PA3, and PA4. The surfaces of the patch antennas PA1, PA2, PA3, and PA4 are parallel to each other as depicted, for example, in later-described FIG. 6.

Figure 2:
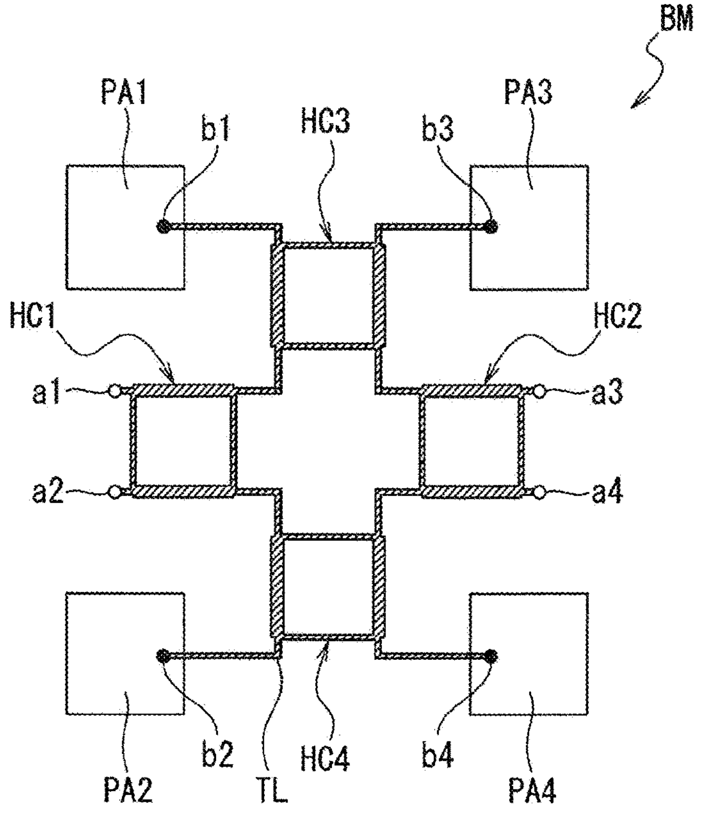
FIG. 2 is a diagram illustrating an example configuration of a Butler matrix circuit according to the first embodiment of the present disclosure.

FIG. 2 is a diagram illustrating an example configuration of a Butler matrix circuit BM according to the first embodiment of the present disclosure. The Butler matrix circuits BM-V and BM-H depicted in FIG. 1 have the same configuration as that of the Butler matrix circuit BM depicted, for example, in FIG. 2. As depicted in FIG. 2, the Butler matrix circuit BM which is of a 4-input 4-output type includes four input terminals a1, a2, a3, and a4, four output terminals b1, b2, b3, and b4, and a transmission line TL for connecting the input terminals a1, a2, a3, and a4 to the output terminals b1, b2, b3, and b4. Further, the Butler matrix circuit BM includes four hybrid couplers HC1, HC2, HC3, and HC4 which are disposed in the transmission line TL.

The Butler matrix circuit BM is configured to generate a directional beam in four directions by selectively inputting a signal to the input terminals a1, a2, a3, and a4. The hybrid couplers HC1, HC2, HC3, and HC4 each equally distribute input power and generate an output with a phase difference of 90° applied to an input signal. Table 1 illustrates an example relation between input and output signals in the Butler matrix circuit BM. It should be noted that arrows in the "Antenna beam direction" field in Table 1 indicate the antenna beam tilt direction with respect to the normal direction of each surface of the patch antennas PA1, PA2, PA3, and PA4. More specifically, the arrow pointing in the upper left direction indicates that an antenna beam is tilted toward the patch antenna PA1. The arrow pointing in the lower left direction indicates that the antenna beam is tilted toward the patch antenna PA2. The arrow pointing in the upper right direction indicates that the antenna beam is tilted toward the patch antenna PA3. The arrow pointing in the lower right direction indicates that the antenna beam is tilted toward the patch antenna PA4.

TABLE 1

| | Amount of phase shift | | | | Antenna beam |
|---|---|---|---|---|---|
| | b1 | b2 | b3 | b4 | direction |
| a1 | 0° | −90° | −90° | −180° | ↘ |
| a2 | −90° | 0° | −180° | −90° | ↗ |
| a3 | −90° | −180° | 0° | −90° | ↙ |
| a4 | −180° | −90° | −90° | 0° | ↖ |

As illustrated in Table 1, when a signal is inputted to the input terminal a1, the output terminals b1, b2, b3, and b4 output signals that are respectively phase-shifted by 0°, −90°, −90°, and −180° from the inputted signal. Signal waves outputted respectively from the output terminals b1, b2, b3, and b4 are combined to output the antenna beam in a direction that is tilted approximately 30° toward the patch antenna PA4 with respect to the normal direction of each surface of the patch antennas PA1, PA2, PA3, and PA4 (e.g., the Z-axis direction depicted, for example, in later-described FIG. 6).

Similarly, when a signal is inputted to the input terminal a2, the output terminals b1, b2, b3, and b4 output signals that are respectively phase-shifted by −90°, 0°, −180°, and −90° from the inputted signal. Signal waves outputted respectively from the output terminals b1, b2, b3, and b4 are combined to output the antenna beam in a direction that is tilted approximately 30° toward the patch antenna PA3 with respect to the Z-axis direction.

When a signal is inputted to the input terminal a3, the output terminals b1, b2, b3, and b4 output signals that are respectively phase-shifted by −90°, −180°, 0°, and −90° from the inputted signal. Signal waves outputted respectively from the output terminals b1, b2, b3, and b4 are combined to output the antenna beam in a direction that is tilted approximately 30° toward the patch antenna P2 with respect to the Z-axis direction.

When a signal is inputted to the input terminal a4, the output terminals b1, b2, b3, and b4 output signals that are respectively phase-shifted by −180°, −90°, −90°, and 0° from the inputted signal. Signal waves outputted respectively from the output terminals b1, b2, b3, and b4 are combined to output the antenna beam in a direction that is tilted approximately 30° toward the patch antenna PA1 with respect to the Z-axis direction.

Figure 3:
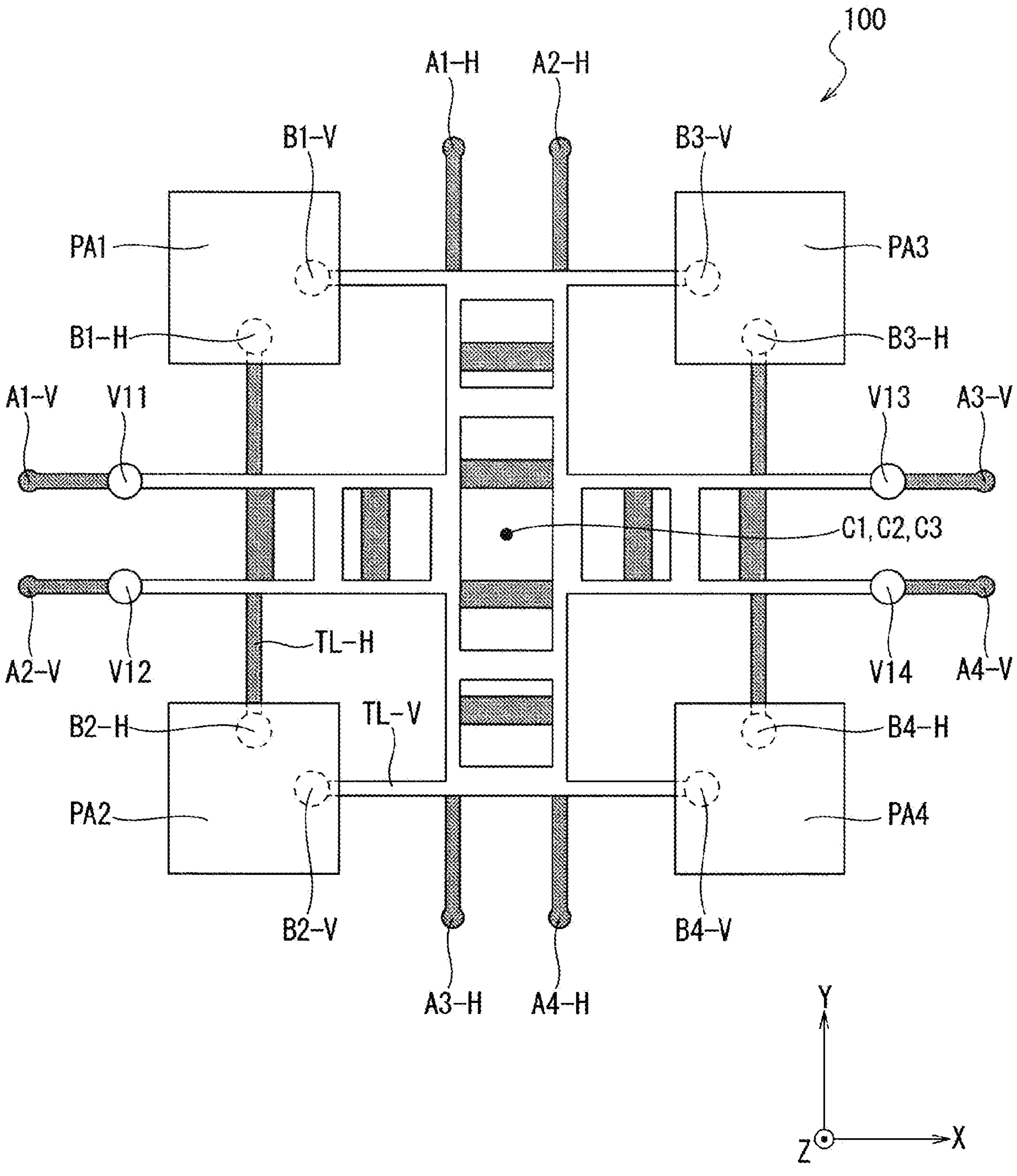
FIG. 3 is a plan view schematically illustrating an example configuration of an antenna circuit board according to the first embodiment of the present disclosure.
Figure 4:
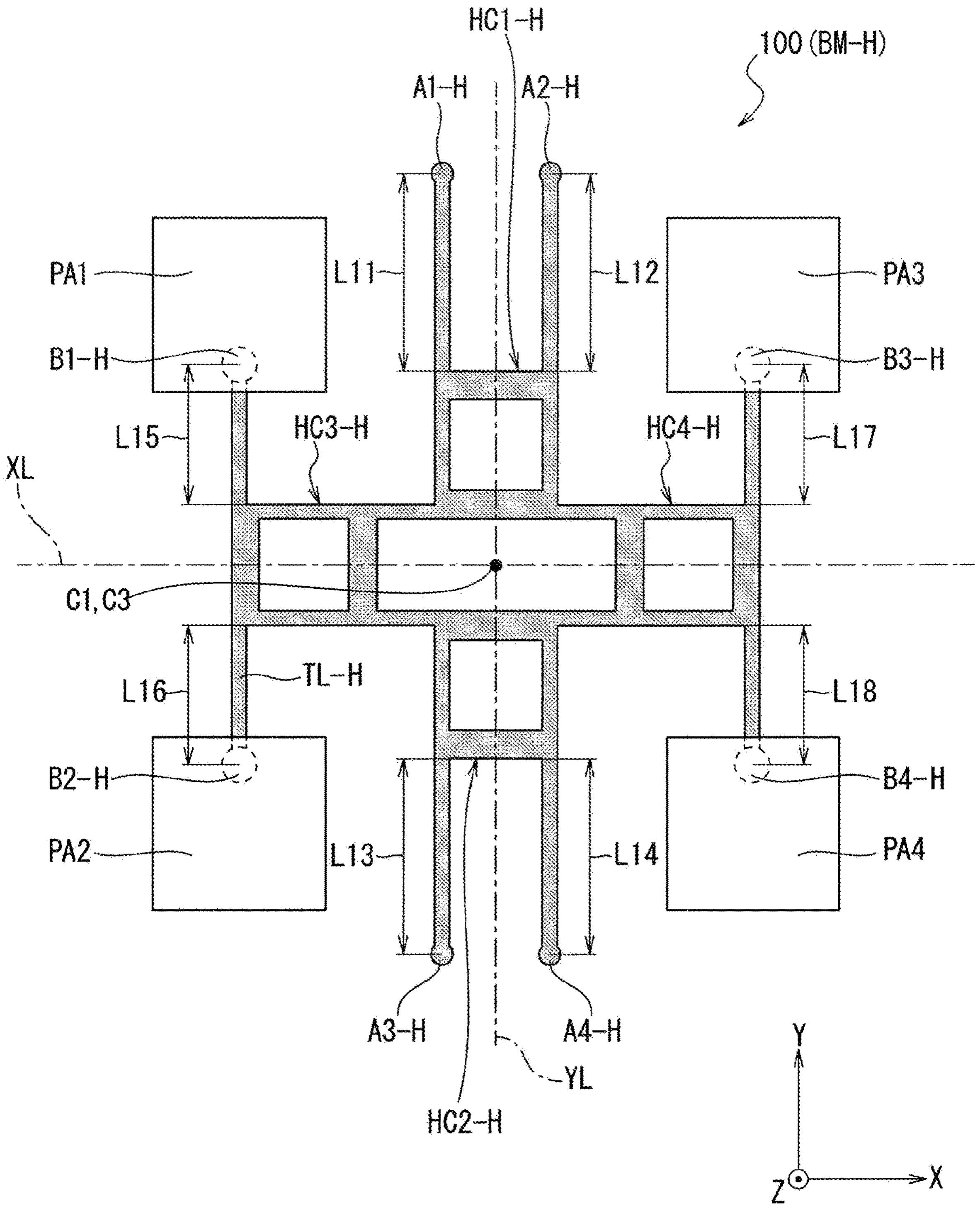
FIG. 4 is a plan view schematically illustrating an example configuration of a Butler matrix circuit for horizontal polarization in the antenna circuit board according to the first embodiment of the present disclosure.
Figure 5:
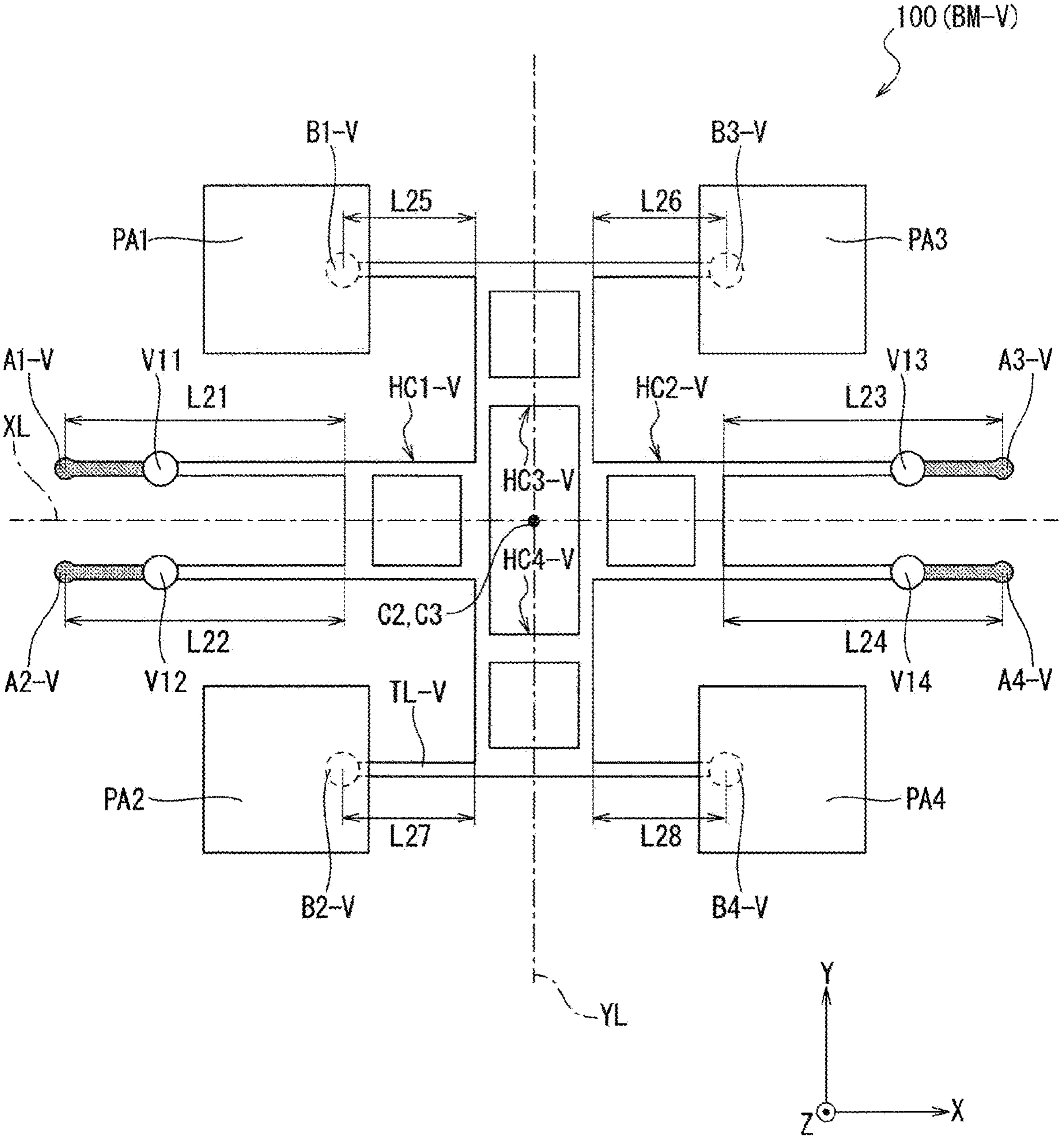
FIG. 5 is a plan view schematically illustrating an example configuration of a Butler matrix circuit for vertical polarization in the antenna circuit board according to the first embodiment of the present disclosure.
Figure 6:
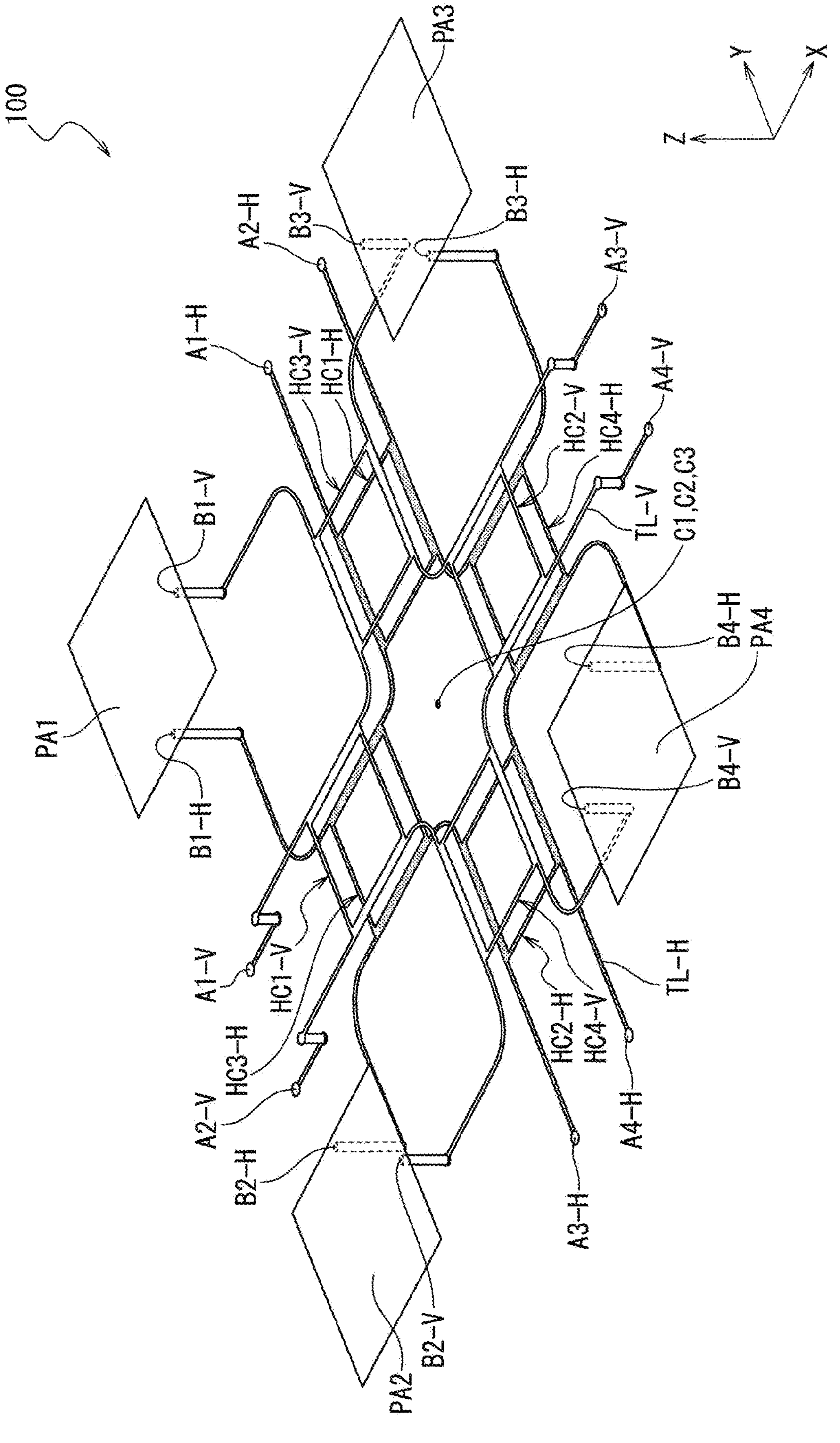
FIG. 6 is a perspective view schematically illustrating an example configuration of the antenna circuit board according to the first embodiment of the present disclosure.

FIG. 3 is a plan view schematically illustrating an example configuration of the antenna circuit board 100 according to the first embodiment of the present disclosure. FIG. 4 is a plan view schematically illustrating an example configuration of the Butler matrix circuit BM-H for horizontal polarization in the antenna circuit board 100 according to the first embodiment of the present disclosure. FIG. 5 is a plan view schematically illustrating an example configuration of the Butler matrix circuit BM-V for vertical polarization in the antenna circuit board 100 according to the first embodiment of the present disclosure. FIG. 6 is a perspective view schematically illustrating an example configuration of the antenna circuit board 100 according to the first embodiment of the present disclosure.

The antenna circuit board 100 is configured such that two different Butler matrix circuit systems are connected to the patch antennas which are arranged in two rows and two columns. In order to handle both horizontally polarized waves and vertically polarized waves, the patch antennas are rectangular in shape when viewed in plan and are disposed at equal intervals in the X- and Y-axis directions. As depicted, for example, in FIGS. 3 to 6, the four patch antennas PA1, PA2, PA3, and PA4 are square in shape when viewed in plan. The patch antennas PA1, PA2, PA3, and PA4 are positioned one by one at a corner of a square.

The patch antenna PA1 is connected to an output terminal B1-H of the Butler matrix circuit BM-H for horizontal polarization, and connected to an output terminal B1-V of the Butler matrix circuit BM-V for vertical polarization. The output terminal B1-V functions as a feed point for horizontal polarization. The output terminal B1-V functions as a feed point for vertical polarization. The output terminals B1-H and B1-V are disposed apart from each other. For example, the output terminal B1-H is disposed at a position adjacent to an outer peripheral side of the patch antenna PA1, the outer peripheral side being one of four outer peripheral sides of the patch antenna PA1 and being parallel to the X-axis direction. This ensures that the antenna beam outputted from the patch antenna PA1 using the output terminal B1-H as the feed point is polarized in the Y-axis direction. Meanwhile, the output terminal B1-V is disposed at a position adjacent to an outer peripheral side of the patch antenna PA1, the outer peripheral side being one of the four outer peripheral sides of the patch antenna PA1 and being parallel to the Y-axis direction. This ensures that the antenna beam outputted from the patch antenna PA1 using the output terminal B1-V as the feed point is polarized in the X-axis direction.

Similarly, the patch antenna PA2 is connected to an output terminal B2-H of the Butler matrix circuit BM-H for horizontal polarization, and connected to an output terminal B2-V of the Butler matrix circuit BM-V for vertical polarization. The output terminal B1-H functions as a feed point for horizontal polarization. The output terminal B2-V functions as a feed point for vertical polarization. The output terminals B2-H and B2-V are disposed apart from each other. For example, the output terminal B2-H is disposed at a position adjacent to an outer peripheral side of the patch antenna PA2, the outer peripheral side being one of four outer peripheral sides of the patch antenna PA2 and being parallel to the X-axis direction. The output terminal B2-V is disposed at a position adjacent to an outer peripheral side of the patch antenna PA2, the outer peripheral side being one of the four outer peripheral sides of the patch antenna PA2 and being parallel to the Y-axis direction.

The patch antenna PA3 is connected to an output terminal B3-H of the Butler matrix circuit BM-H for horizontal polarization, and connected to an output terminal B3-V of the Butler matrix circuit BM-V for vertical polarization. The output terminal B3-H functions as a feed point for horizontal polarization. The output terminal B3-V functions as a feed point for vertical polarization. The output terminals B3-H and B3-V are disposed apart from each other. For example, the output terminal B3-H is disposed at a position adjacent to an outer peripheral side of the patch antenna PA3, the outer peripheral side being one of four outer peripheral sides of the patch antenna PA3 and being parallel to the X-axis direction. The output terminal B3-V is disposed at a position adjacent to an outer peripheral side of the patch antenna PA3, the outer peripheral side being one of the four outer peripheral sides of the patch antenna PA3 and being parallel to the Y-axis direction.

The patch antenna PA4 is connected to an output terminal B4-H of the Butler matrix circuit BM-H for horizontal polarization, and connected to an output terminal B4-V of the Butler matrix circuit BM-V for vertical polarization. The output terminal B4-H functions as a feed point for horizontal polarization. The output terminal B4-V functions as a feed point for vertical polarization. The output terminals B4-H and B4-V are disposed apart from each other. For example, the output terminal B4-H is disposed at a position adjacent to an outer peripheral side of the patch antenna PA4, the outer peripheral side being one of four outer peripheral sides of the patch antenna PA4 and being parallel to the X-axis direction. The output terminal B4-V is disposed at a position adjacent to an outer peripheral side of the patch antenna PA3, the outer peripheral side being one of the four outer peripheral sides of the patch antenna PA3 and being parallel to the Y-axis direction.

As depicted in FIG. 4, the Butler matrix circuit BM-H for horizontal polarization includes four hybrid couplers HC1-H, HC2-H, HC3-H, and HC4-H. The hybrid coupler HC1-H is connected to input terminals A1-H and A2-H. The hybrid coupler HC2-H is connected to input terminals A3-H and A4-H. The hybrid coupler HC3-H is connected to output terminals B1-H and B2-H. The hybrid coupler HC4-H is connected to output terminals B3-H and B4-H. Signals inputted to the input terminals A1-H, A2-H, A3-H, and A4-H are distributed and phase-changed by the Butler matrix circuit BM-H for horizontal polarization, and respectively outputted to the four output terminals B1-H, B2-H, B3-H, and B4-H.

As depicted in FIG. 5, the Butler matrix circuit BM-V for vertical polarization includes four hybrid couplers HC1-V, HC2-V, HC3-V, and HC4-V. The hybrid coupler HC1-V is connected to input terminals A1-V and A2-V through vias V11, V12. The hybrid coupler HC2-V is connected to input terminals A3-V and A4-V through vias V13 and V14. The hybrid coupler HC3-V is connected to output terminals B1-V and B2-V. The hybrid coupler HC4-V is connected to output terminals B3-V and B4-V. Signals inputted to the input terminals A1-V, A2-V, A3-V, and A4-V are distributed and phase-changed by the Butler matrix circuit BM-V for vertical polarization, and respectively outputted to the four output terminals B1-V, B2-V, B3-V, and B4-V.

As depicted in FIGS. 3 to 5, the antenna circuit board 100 is configured such that its center positions C1, C2, and C3 coincide with each other. The center position C1 is as viewed in plan of the Butler matrix circuit BM-H for horizontal polarization. The center position C2 is as viewed in plan of the Butler matrix circuit BM-V for vertical polarization. The center position C3 is as viewed in plan of an antenna group including the four patch antennas PA1, PA2, PA3, and PA4.

As depicted in FIGS. 4 and 5, a virtual line that runs parallel to the X-axis direction and passes through the center positions C1, C2, and C3 is designated as XL. Further, a virtual line that runs parallel to the Y-axis direction and passes through the center positions C1, C2, and C3 is designated as XL. Various sections of the Butler matrix circuit BM-H for horizontal polarization, various sections of the Butler matrix circuit BM-V for vertical polarization, and the patch antennas PA1, PA2, PA3, and PA4 are disposed vertically symmetric with respect to the virtual line XL when viewed in plan, and disposed left-right symmetric with respect to the virtual line YL when viewed in plan.

For example, in the Butler matrix circuit BM-H for horizontal polarization, the hybrid couplers HC1-H and HC2-H are vertically symmetric with respect to the virtual line XL when viewed in plan. The hybrid couplers HC1-H and HC2-H have the same shape and the same line length. Lines L11 and L12, which connect the hybrid coupler HC1-H to the input terminals A1-H and A2-H, and lines L13 and L14, which connect the hybrid coupler HC2-H to the input terminals A3-H and A4-H, are also vertically symmetric with respect to the virtual line XL when viewed in plan. The lines L11, L12, L13, and L14 have the same shape and the same line length.

Further, the hybrid couplers HC3-H and HC4-H are left-right symmetric with respect to the virtual line YL when viewed in plan. The hybrid couplers HC3-H and HC4-H have the same shape and the same line length. Lines L15 and L16, which connect the hybrid coupler HC3-H to the output terminals B1-H and B2-H, and lines L17 and L18, which connect the hybrid coupler HC4-H to the output terminals B3-H and B4-H, are also left-right symmetric with respect to the virtual line YL when viewed in plan. The lines L15, L16, L17, and L18 have the same shape and the same line length.

Similarly, in the Butler matrix circuit BM-V for vertical polarization, the hybrid couplers HC1-V and HC2-V are left-right symmetric with respect to the virtual line YL when viewed in plan. The hybrid couplers HC1-V and HC2-V have the same shape and the same line length. Lines L21 and L22, which connect the hybrid coupler HC1-V to the input terminals A1-V and A2-V, and lines L23 and L24, which connect the hybrid coupler HC2-V to the input terminals A3-V and A4-V, are also left-right symmetric with respect to the virtual line YL when viewed in plan. The lines L21, L22, L23, and L24 have the same shape and the same line length.

Further, the hybrid couplers HC3-V and HC4-V are vertically symmetric with respect to the virtual line XL when viewed in plan. The hybrid couplers HC3-V and HC4-V have the same shape and the same line length. Lines L25 and L26, which connect the hybrid coupler HC3-V to the output terminals B1-V and B3-V, and lines L27 and L28, which connect the hybrid coupler HC4-V to the output terminals B2-V and B4-V, are also vertically symmetric with respect to the virtual line XL when viewed in plan. The lines L25, L26, L27, and L28 have the same shape and the same line length.

Figure 7:
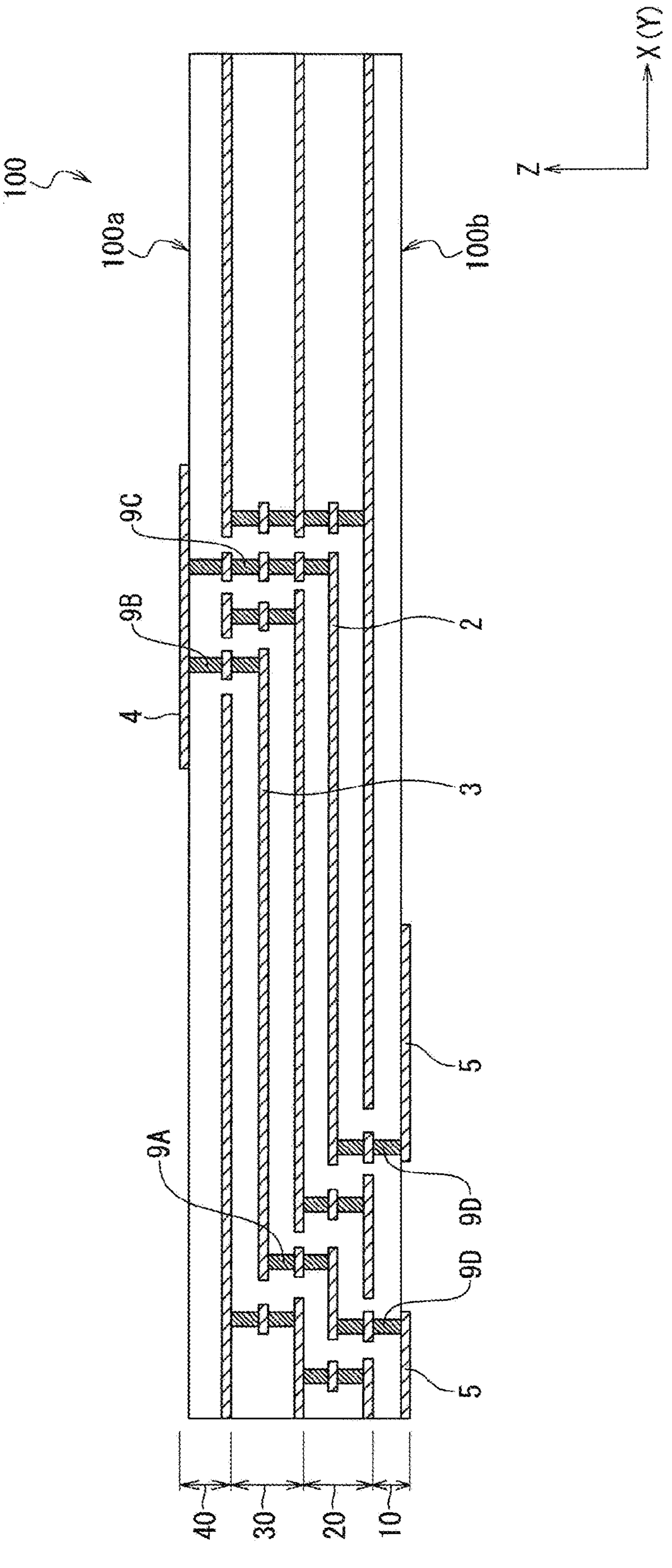
FIG. 7 is a cross-sectional view schematically illustrating an example configuration of the antenna circuit board according to the first embodiment of the present disclosure.

FIG. 7 is a cross-sectional view schematically illustrating an example configuration of the antenna circuit board 100 according to the first embodiment of the present disclosure. The antenna circuit board 100 includes an organic substrate, a build-up substrate, a ceramic substrate, or other appropriate substrates that provide multilayer wiring. Further, the antenna circuit board 100 may include a two-layer stripline or have a multilayered microstripline structure or a multilayered stripline structure. As depicted, for example, in FIG. 7, the antenna circuit board 100 is structured in such a manner that a first organic substrate 10, a first stripline 20, a second stripline 30, and a second organic substrate 40 are layered in the order named.

As depicted in FIG. 7, the antenna circuit board 100 has a front surface 100*a* and a back surface 100*b*. The back surface 100*b* is positioned opposite the front surface 100*a*. The antenna circuit board 100 includes a first conductive layer 2, a second conductive layer 3, and a third conductive layer 4. The first conductive layer 2 is positioned between the front surface 100*a* and the back surface 100*b*. The second conductive layer 3 is positioned between the first conductive layer 2 and the front surface 100*a*. The third conductive layer 4 is positioned opposite the first conductive layer 2 with the second conductive layer 3 sandwiched between the first conductive layer 2 and the third conductive layer 4. For example, the third conductive layer 4 is disposed on the front surface 100*a*. Further, the antenna circuit board 100 includes a fourth conductive layer 5 and connection wires 9A, 9B, 9C, and 9D. The fourth conductive layer 5 is disposed on the back surface 100*b*. The connection wires 9A, 9B, 9C, and 9D are disposed between the front surface 100*a* and the back surface 100*b*.

The connection wire 9A connects the first conductive layer 2 to the second conductive layer 3. The connection wire 9B connects the second conductive layer 3 to the third conductive layer 4. The connection wire 9C connects the first conductive layer 2 to the third conductive layer 4. The connection wire 9D connects the first conductive layer 2 to the fourth conductive layer 5.

The first conductive layer 2, the second conductive layer 3, and the third conductive layer 4 include metal such as copper (Cu) or a Cu alloy. The connection wires 9A, 9B, 9C, and 9D are each formed, for example, by combining a via and a relay wire. The via is disposed in the Z-axis direction. The relay wire is disposed in the horizontal direction (e.g., X- and Y-axis directions). The relay wire may include, for example, a conductive layer that is formed in the same layer as the first conductive layer 2 or the second conductive layer 3.

The Butler matrix circuit BM-H for horizontal polarization includes the first conductive layer 2. For example, the four hybrid couplers HC1-H, HC2-H, HC3-H, and HC4-H included in the Butler matrix circuit BM-H and the wires connected to them each include the first conductive layer 2.

The Butler matrix circuit BM-V for vertical polarization includes the second conductive layer 3. For example, the four hybrid couplers HC1-V, HC2-V, HC3-V, and HC4-V included in the Butler matrix circuit BM-V and the wires connected to them each include the second conductive layer 3. The patch antennas PA1, PA2, PA3, and PA4 each include the third conductive layer 4.

The four output terminals B1-H, B2-H, B3-H, and B4-H for horizontal polarization each include, for example, the connection wire 9C. The four output terminals B1-V, B2-V, B3-V, and B4-V for vertical polarization each include, for example, the connection wire 9B. The four input terminals A1-H, A2-H, A3-H, and A4-H for horizontal polarization and the four input terminals A1-V, A2-V, A3-V, and A4-V for vertical polarization each include, for example, the fourth conductive layer 5. The vias V11, V12, V13, and V14 each include, for example, the connection wires 9A and 9D.

Figure 8:
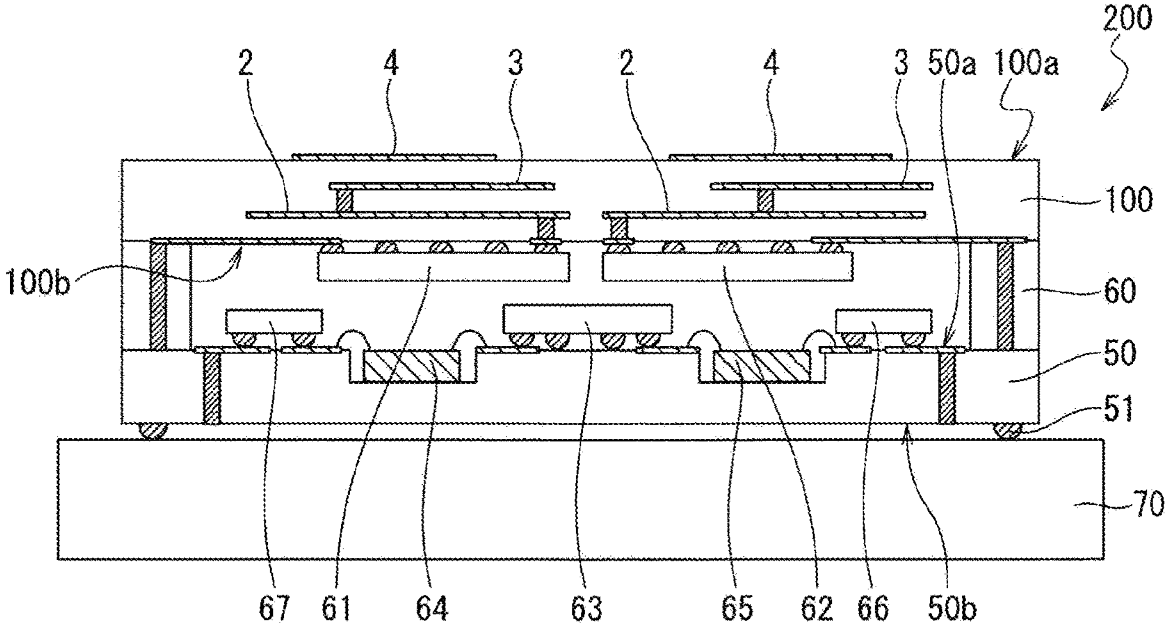
FIG. 8 is a cross-sectional view illustrating a first example configuration of the phased array antenna device according to the first embodiment of the present disclosure.

FIG. 8 is a cross-sectional view illustrating a first example configuration of the phased array antenna device 200 according to the first embodiment of the present disclosure. As depicted in FIG. 8, the phased array antenna device 200 includes the antenna circuit board 100, a wiring substrate 50, a plurality of connection parts 60, and a plurality of electronic parts 61 to 67. The wiring substrate 50 faces the antenna circuit board 100. In the embodiments of the present disclosure, packaged electronic parts may be referred to as electronic modules.

The wiring substrate 50 includes an insulating substrate acting as a core (this substrate is hereinafter referred to as a core substrate), a plurality of wiring patterns disposed on at least one side of the core substrate, and a plurality of insulating layers. The wiring patterns and the insulating layers are alternately disposed in the thickness direction of the core substrate. Further, through-holes are formed in the insulating layers. Upper wiring patterns are connected to lower wiring patterns through the through-holes. For example, a land for electrically connecting the wiring substrate 50 to electronic parts is disposed on a front surface 50*a* of the wiring substrate 50. A terminal section 51 is disposed on a back surface 50*b* of the wiring substrate 50 in order to mount the wiring substrate 50 on another substrate 70. The connection parts 60 are substrate-to-substrate connectors or other parts having a wiring inside an insulator.

The electronic parts 61 and 62 are mounted on the back surface 100*b* of the antenna circuit board 100. The electronic parts 61 and 62 have the functionality, for example, of the single-pole quadruple-throw (SP4T) switches 118 and 130 depicted in FIG. 1. It should be noted that the electronic parts 61 and 62 in the embodiments of the present disclosure are not limited to the above type.

The electronic parts 63 to 67 are mounted on the front surface 50*a* side of the wiring substrate 50. For example, the electronic part 63 has the functionality, for example, of the single-pole double-throw (SPDT) switch 114 depicted in FIG. 1. The electronic part 64 has the functionality of the power amplifier (PA) 112 depicted in FIG. 1. The electronic part 65 has the functionality of the low-noise amplifiers (LNAs) 120 and 134 depicted in FIG. 1. The electronic parts 66 and 67 are surface mount devices (SMDs). For example, transistors, diodes, resistors, capacitors, or inductors for surface mounting may be used as the SMDs. It should be noted that the electronic parts 63 to 67 in the embodiments of the present disclosure are not limited to the above types.

Figure 9:
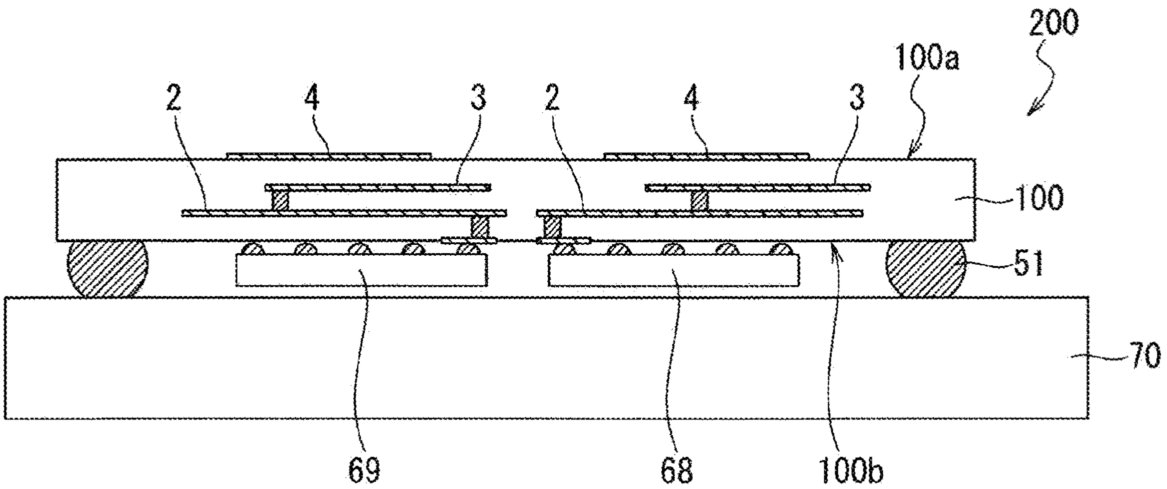
FIG. 9 is a cross-sectional view illustrating a second example configuration of the phased array antenna device according to the first embodiment of the present disclosure.

FIG. 9 is a cross-sectional view illustrating a second example configuration of the phased array antenna device 200 according to the first embodiment of the present disclosure. As depicted in FIG. 9, the phased array antenna device 200 includes the antenna circuit board 100 on which the antenna circuit board 100 is disposed, and additionally includes electronic parts 68 and 69 which are mounted on the back surface 100*b* of the antenna circuit board 100. The electronic part 68 has the functionality, for example, of the single-pole quadruple-throw (SP4T) switches 118 and 130 depicted in FIG. 1. The electronic part 69 is an MMIC (Monolithic Microwave Integrated Circuit). It should be noted that the electronic parts 68 and 69 in the embodiments of the present disclosure are not limited to the above types.

As described above, the phased array antenna device 200 according to the first embodiment of the present disclosure (an example of an "antenna device" according to the present disclosure) includes the antenna circuit board 100 (an example of a "circuit board" according to the present disclosure). The antenna circuit board 100 includes the four patch antennas PA1, PA2, PA3, and PA4 (examples of "antennas" according to the present disclosure) which are disposed apart from each other, the Butler matrix circuit BM-H for horizontal polarization (an example of a "first Butler matrix circuit" according to the present disclosure)

which is connected to each of the four patch antennas PA1, PA2, PA3, and PA4, and the Butler matrix circuit BM-V for vertical polarization (an example of a "second Butler matrix circuit" according to the present disclosure) which is connected to each of the four patch antennas PA1, PA2, PA3, and PA4. In the four patch antennas PA1, PA2, PA3, and PA4, the output terminals B1-H, B2-H, B3-H, and B4-H (examples of "first feed points" according to the present disclosure) and the output terminals B1-V, B2-V, B3-V, and B4-V (examples of "second feed points" according to the present disclosure) are respectively disposed apart from each other.

Consequently, the antenna circuit board 100 is able to use the output terminals B1-H, B2-H, B3-H, and B4-H as the feed points for horizontal polarization of a millimeter wave band and use the output terminals B1-V, B2-V, B3-V, and B4-V as the feed points for vertical polarization of the millimeter wave band. The antenna circuit board 100 is capable of handling two different polarizations of the millimeter wave band, and is thus able to efficiently transmit the millimeter wave band signals.

Further, the Butler matrix circuits BM cause the output terminals B1, B2, B3, and B4 to output signals phase-shifted at regular intervals when a signal is inputted to any one of the input terminals A1, A2, A3, and A4. The Butler matrix circuits BM have both a divider function and a phase shift function. For example, when the single-pole double-throw switch 114 is connected to the Butler matrix circuit BM-V, the antenna circuit board 100 forms a phase-shift circuit for vertical polarization. Further, when the single-pole double-throw switch 130 is connected to the Butler matrix circuit BM-H, the antenna circuit board 100 forms a phase-shift circuit for horizontal polarization. The Butler matrix circuits BM have a simple circuit configuration because they are passive circuits formed by passive components only.

Phase-shift circuits generally use a phase shifter that changes a delay line and capacitance. However, the use of such a phase shifter increases a circuit scale because each antenna requires a phase shifter and a driver for controlling the phase shifter. Meanwhile, the antenna circuit board 100 forms a phase-shift circuit by connecting the switches to the Butler matrix circuits BM which are passive circuits. This reduces the circuit scale of the phase-shift circuit. As a result, the antenna circuit board 100 is able to achieve downsizing and low power consumption. The antenna circuit board 100 and the phased array antenna device 200 including the antenna circuit board 100 are suitable for use in mobile terminals because they achieve downsizing and low power consumption.

Further, the antenna circuit board 100 is configured such that the Butler matrix circuit BM-H for horizontal polarization and the Butler matrix circuit BM-H for vertical polarization are disposed to overlap with each other in the Z-axis direction. As a result, the area occupied by the Butler matrix circuits BM-H and BM-V can be reduced. This can contribute to further downsizing of the antenna circuit board 100 and the phased array antenna device 200.

Moreover, the Butler matrix circuit BM-H for horizontal polarization includes the four input terminals A1-H, A2-H, A3-H, and A4-H (examples of "first terminals" according to the present disclosure), the hybrid coupler HC1-H connected to the input terminals A1-H and A2-H, the hybrid coupler HC2-H connected to the input terminals A3-H and A4-H, the hybrid coupler HC3-H connected to the output terminals B1-H and B2-H, and the hybrid coupler HC4-H connected to the output terminals B3-H and B4-H. The hybrid couplers HC1-H and HC2-H are examples of "first hybrid couplers" according to the present disclosure. The hybrid couplers HC3-H and HC4-H are examples of "second hybrid couplers" according to the present disclosure.

Similarly, the Butler matrix circuit BM-V for vertical polarization includes the four input terminals A1-V, A2-V, A3-V, and A4-V (examples of "second terminals" according to the present disclosure), the hybrid coupler HC1-V connected to the input terminals A1-V and A2-V, the hybrid coupler HC2-V connected to the input terminals A3-V and A4-V, the hybrid coupler HC3-V connected to the output terminals B1-V and B3-V, and the hybrid coupler HC4-V connected to the output terminals B2-V and B4-V. The hybrid couplers HC1-V and HC2-V are examples of "third hybrid couplers" according to the present disclosure. The hybrid couplers HC3-V and HC4-V are examples of "fourth hybrid couplers" according to the present disclosure.

The hybrid coupler HC1-H, which is connected to the input terminals A1-H and A2-H, and the hybrid coupler HC1-V, which is connected to the input terminals A1-V and A2-V, have the same shape and the same line length. The hybrid coupler HC2-H, which is connected to the input terminals A3-H and A4-H, and the hybrid coupler HC2-V, which is connected to the input terminals A3-V and A4-V, have the same shape and the same line length.

Further, the hybrid coupler HC3-H, which is connected to the output terminals B1-H and B2-H, and the hybrid coupler HC3-V, which is connected to the output terminals B1-V and B3-V, have the same shape and the same line length. The hybrid coupler HC4-H, which is connected to the output terminals B3-H and B4-H, and the hybrid coupler HC4-V, which is connected to the output terminals B2-V and B4-V, have the same shape and the same line length.

Moreover, the lines L15, L16, L17, and L18 (examples of "third lines" according to the present disclosure) of the Butler matrix circuit BM-H for horizontal polarization and the lines L25, L26, L27, and L28 (examples of "fourth lines" according to the present disclosure) of the Butler matrix circuit BM-V for vertical polarization have the same length and the same line length.

This can ensure that the line length between the input terminals A1-H, A2-H, A3-H, and A4-H of the Butler matrix circuit BM-H for horizontal polarization and the output terminals B1-H, B2-H, B3-H, and B4-H is similar to the line length between the input terminals A1-V, A2-V, A3-V, and A4-V of the Butler matrix circuit BM-V for vertical polarization and the output terminals B1-V, B2-V, B3-V, and B4-V.

It should be noted that the first embodiment, which has been described above, is configured such that the patch antennas PA1, PA2, PA3, and PA4 are square in shape when viewed in plan. However, the present disclosure is not limited to such a configuration. Alternatively, when viewed in plan, the patch antennas PA1, PA2, PA3, and PA4 may be shaped like a rectangle, a polygon other than a square or a rectangle, a circle, or an ellipse.

Second Embodiment

In the embodiments of the present disclosure, the Butler matrix circuit BM-V for vertical polarization and the Butler matrix circuit BM-H for horizontal polarization may each include a plurality of conductive layers.

Figure 10:
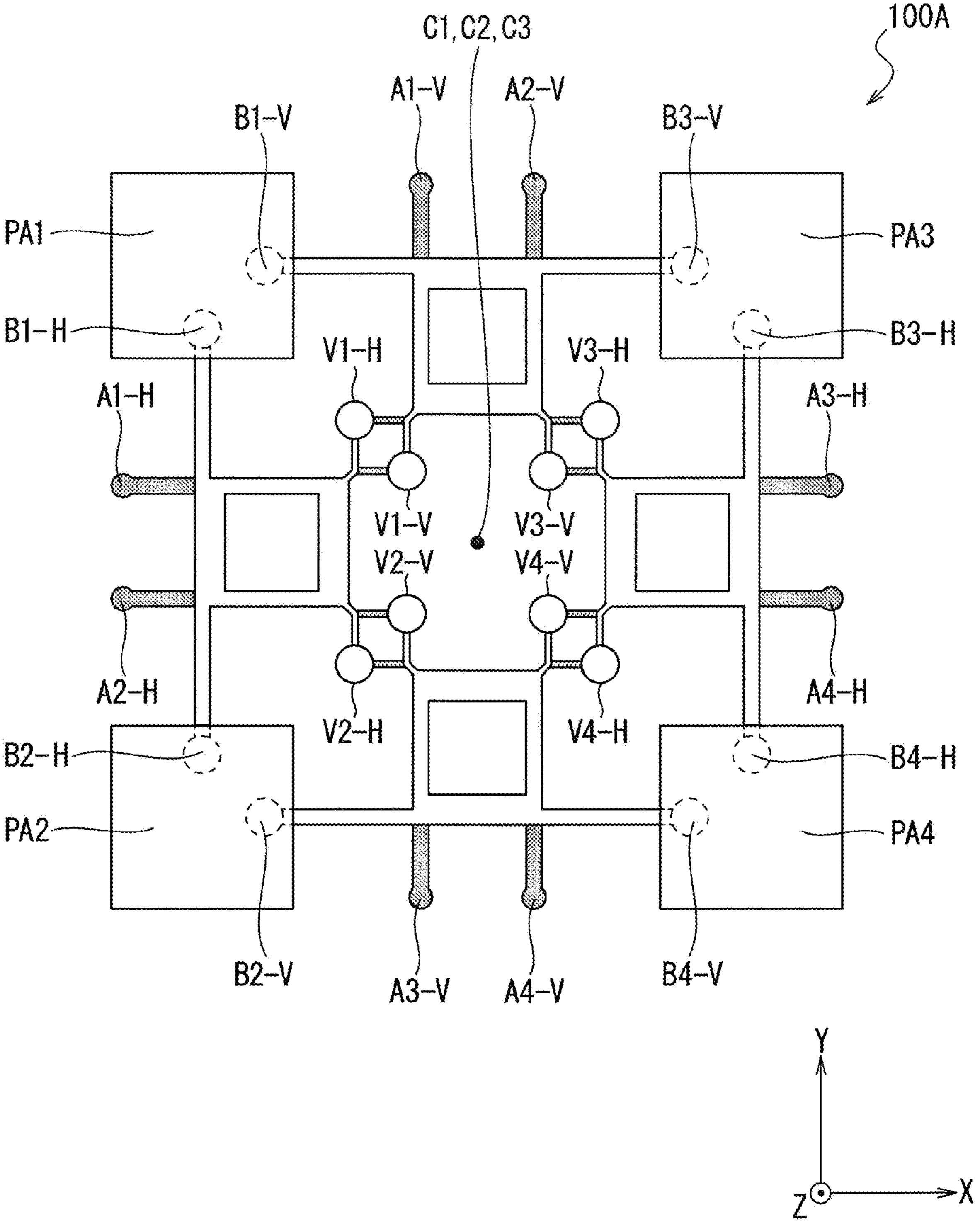
FIG. 10 is a plan view schematically illustrating an example configuration of an antenna circuit board according to a second embodiment of the present disclosure.
Figure 11:
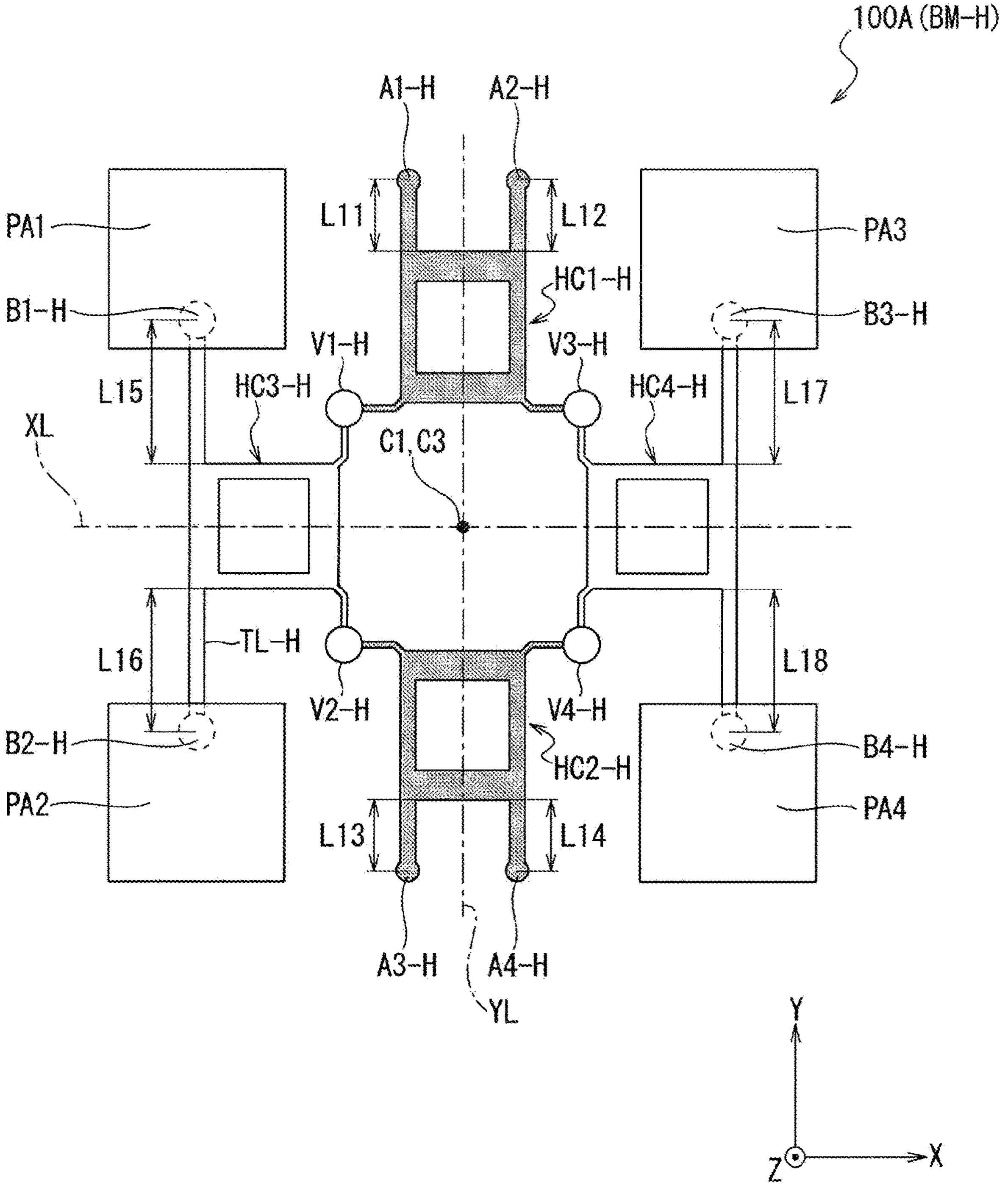
FIG. 11 is a plan view schematically illustrating an example configuration of the Butler matrix circuit for horizontal polarization in the antenna circuit board according to the second embodiment of the present disclosure.
Figure 12:
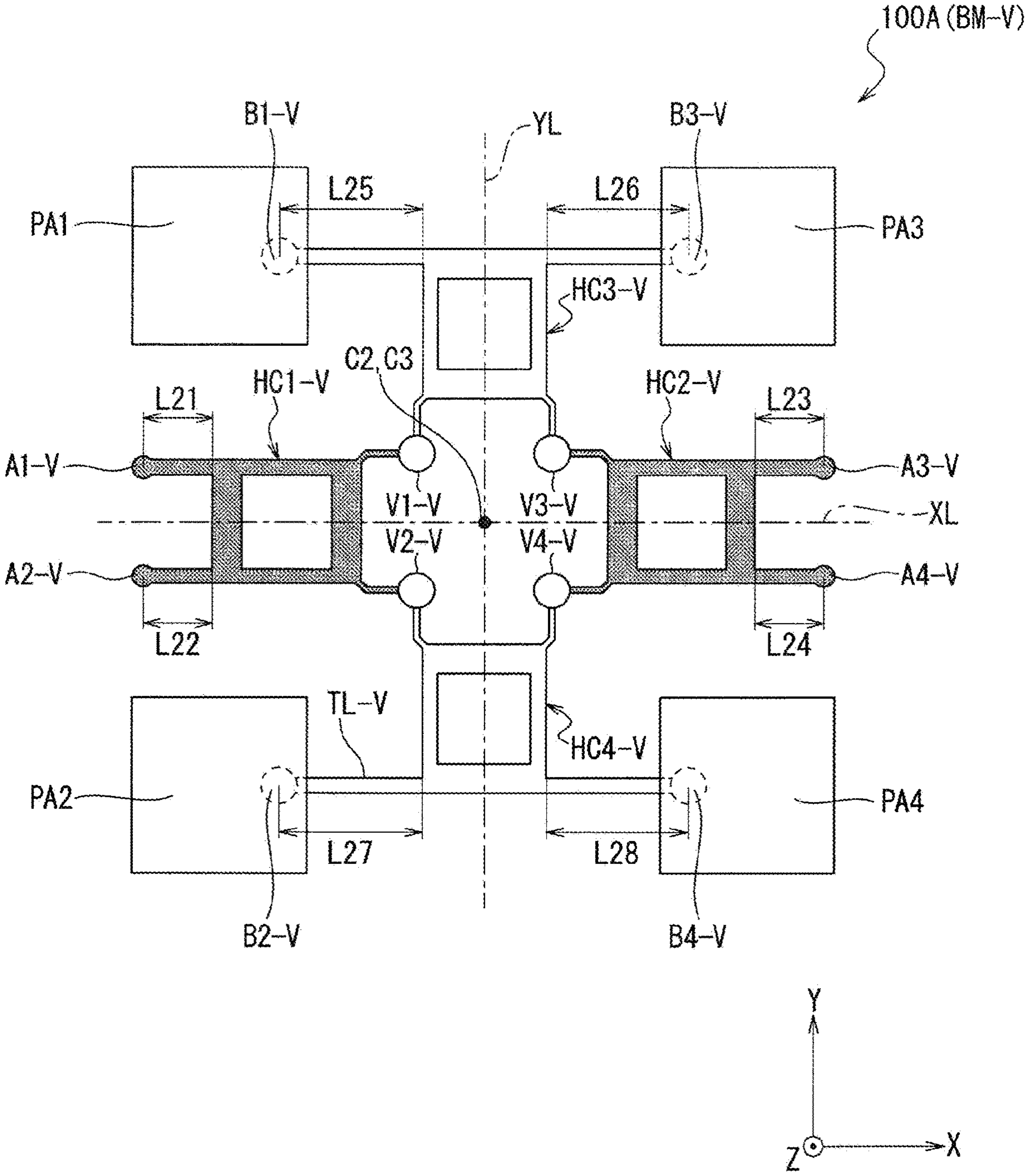
FIG. 12 is a plan view schematically illustrating an example configuration of the Butler matrix circuit for vertical polarization in the antenna circuit board according to the second embodiment of the present disclosure.
Figure 13:
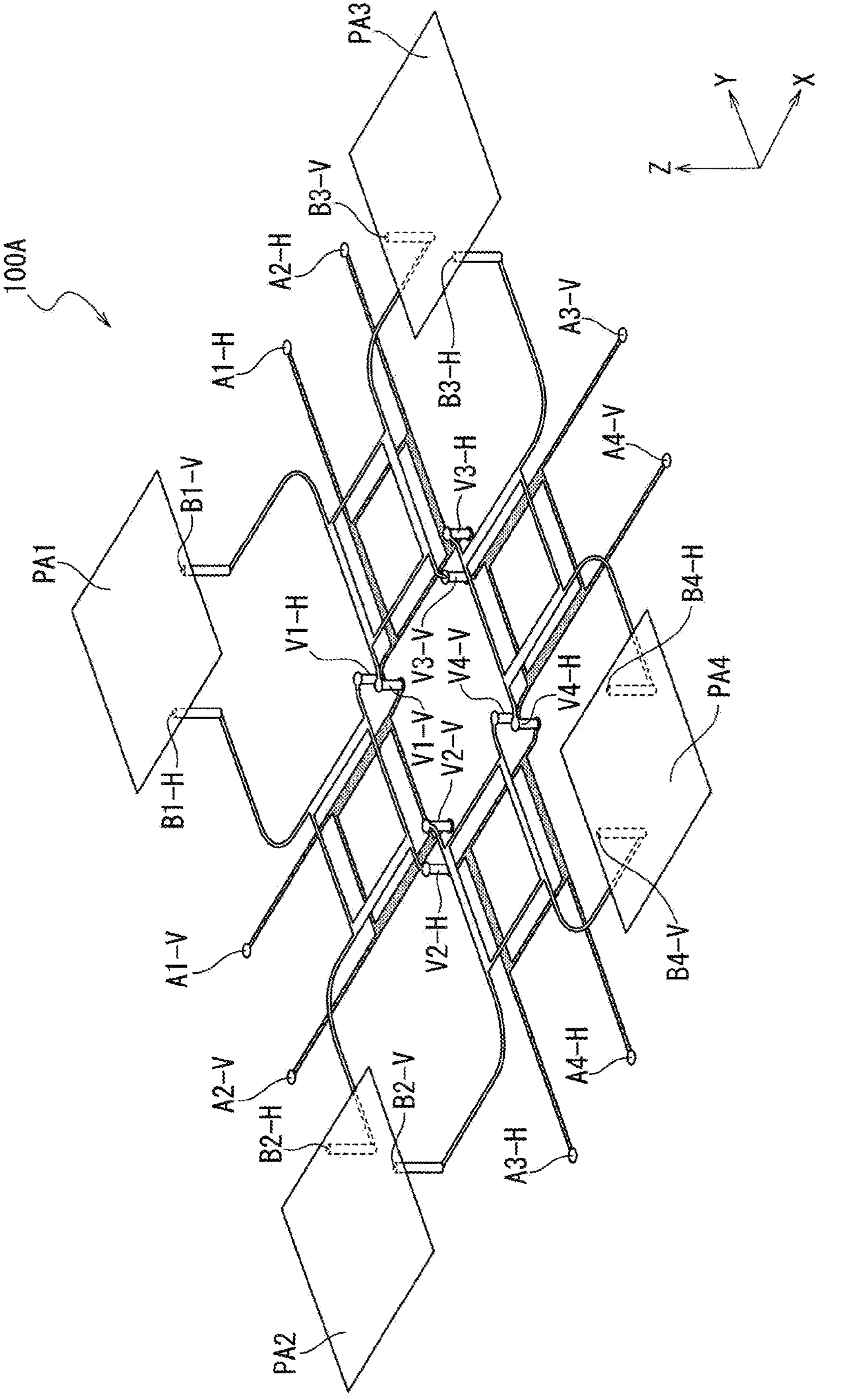
FIG. 13 is a perspective view schematically illustrating an example configuration of the antenna circuit board according to the second embodiment of the present disclosure.
Figure 14:
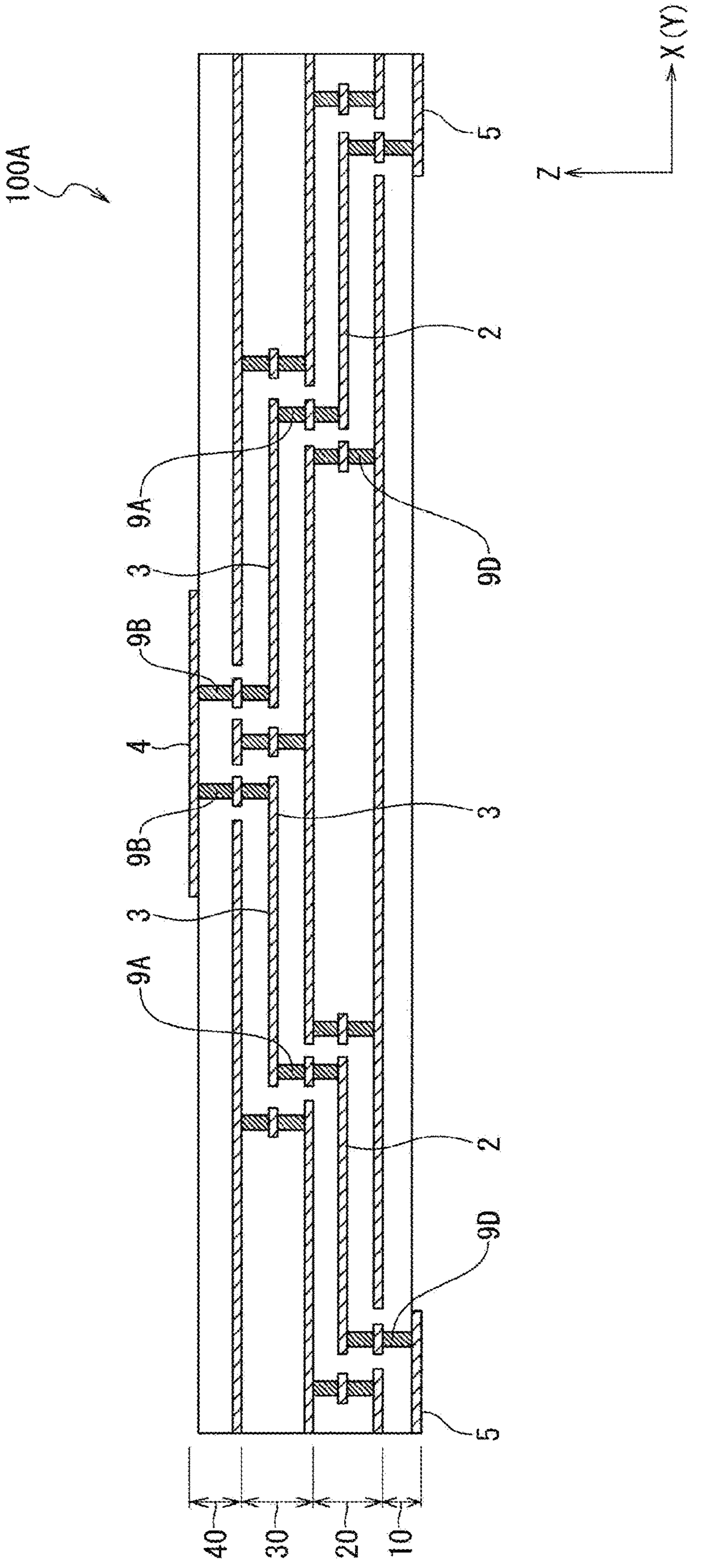
FIG. 14 is a cross-sectional view schematically illustrating an example configuration of the antenna circuit board according to the second embodiment of the present disclosure.

FIG. 10 is a plan view schematically illustrating an example configuration of an antenna circuit board 100A according to a second embodiment of the present disclosure. FIG. 11 is a plan view schematically illustrating an example configuration of the Butler matrix circuit BM-H for horizontal polarization in the antenna circuit board 100A according to the second embodiment of the present disclosure. FIG. 12 is a plan view schematically illustrating an example configuration of the Butler matrix circuit BM-V for vertical polarization in the antenna circuit board 100A according to the second embodiment of the present disclosure. FIG. 13 is a perspective view schematically illustrating an example configuration of the antenna circuit board 100A according to the second embodiment of the present disclosure. FIG. 14 is a cross-sectional view schematically illustrating an example configuration of the antenna circuit board 100A according to the second embodiment of the present disclosure.

As depicted in FIGS. 10 to 13, the Butler matrix circuit BM-H for horizontal polarization and the Butler matrix circuit BM-V for vertical polarization, which are included in the antenna circuit board 100A, are both configured such that the hybrid couplers HC1-H, HC2-H, HC1-V, and HC2-V which are positioned toward the input terminals include a first one of the conductive layers, and that the hybrid couplers HC3-H, HC4-H, HC3-V, and HC4-V which are positioned toward the output terminals include a second one of the conductive layers. The first one of the conductive layers is the first conductive layer 2 depicted, for example, in FIG. 14. The second one of the conductive layers is the second conductive layer 3 depicted, for example, in FIG. 14. The patch antennas PA1, PA2, PA3, and PA4 include the third conductive layer 4 depicted, for example, in FIG. 14.

Further, the antenna circuit board 100A is configured such that, when the Butler matrix circuit BM-V is rotated 90° relative to the Butler matrix circuit BM-H around the center positions C1 and C2, the Butler matrix circuit BM-H and the Butler matrix circuit BM-V coincide with each other as viewed in plan except for vias V1-H, V2-H, V3-H, and V4-H and their peripheral areas and vias V1-V, V2-V, V3-V, and V4-V and their peripheral areas.

In the antenna circuit board 100A, the lines L11, L12, L13, and L14 (examples of "first lines" according to the present disclosure) and the lines L21, L22, L23, and L24 (examples of "second lines" according to the present disclosure) have the same shape and the same line length. Further, the lines L15 to L18 and the lines L25 to L28 also have the same shape and the same line length.

Moreover, a line connecting the hybrid coupler HC1-H to the hybrid coupler HC3-H through the via V1-H and a line connecting the hybrid coupler HC1-V to the hybrid coupler HC3-V through the via V1-V have the same line length. Similarly, a line connecting the hybrid coupler HC1-H to the hybrid coupler HC4-H through the via V2-H and a line connecting the hybrid coupler HC1-V to the hybrid coupler HC4-V through the via V2-V have the same line length. A line connecting the hybrid coupler HC2-H to the hybrid coupler HC3-H through the via V3-H and a line connecting the hybrid coupler HC2-V to the hybrid coupler HC3-V through the via V3-V have the same line length. A line connecting the hybrid coupler HC2-H to the hybrid coupler HC4-H through the via V4-H and a line connecting the hybrid coupler HC2-V to the hybrid coupler HC4-V through the via V4-V have the same line length.

As described above, the antenna circuit board 100A is configured such that the line length between the input terminals A1-H, A2-H, A3-H, and A4-H and the patch antennas PA1, PA2, PA3, and PA4 is the same as the line length between the input terminals A1-V, A2-V, A3-V, and A4-V and the patch antennas PA1, PA2, PA3, and PA4. This can reduce the characteristic difference between the Butler matrix circuit BM-H and the Butler matrix circuit BM-V.

Third Embodiment

Figure 15:
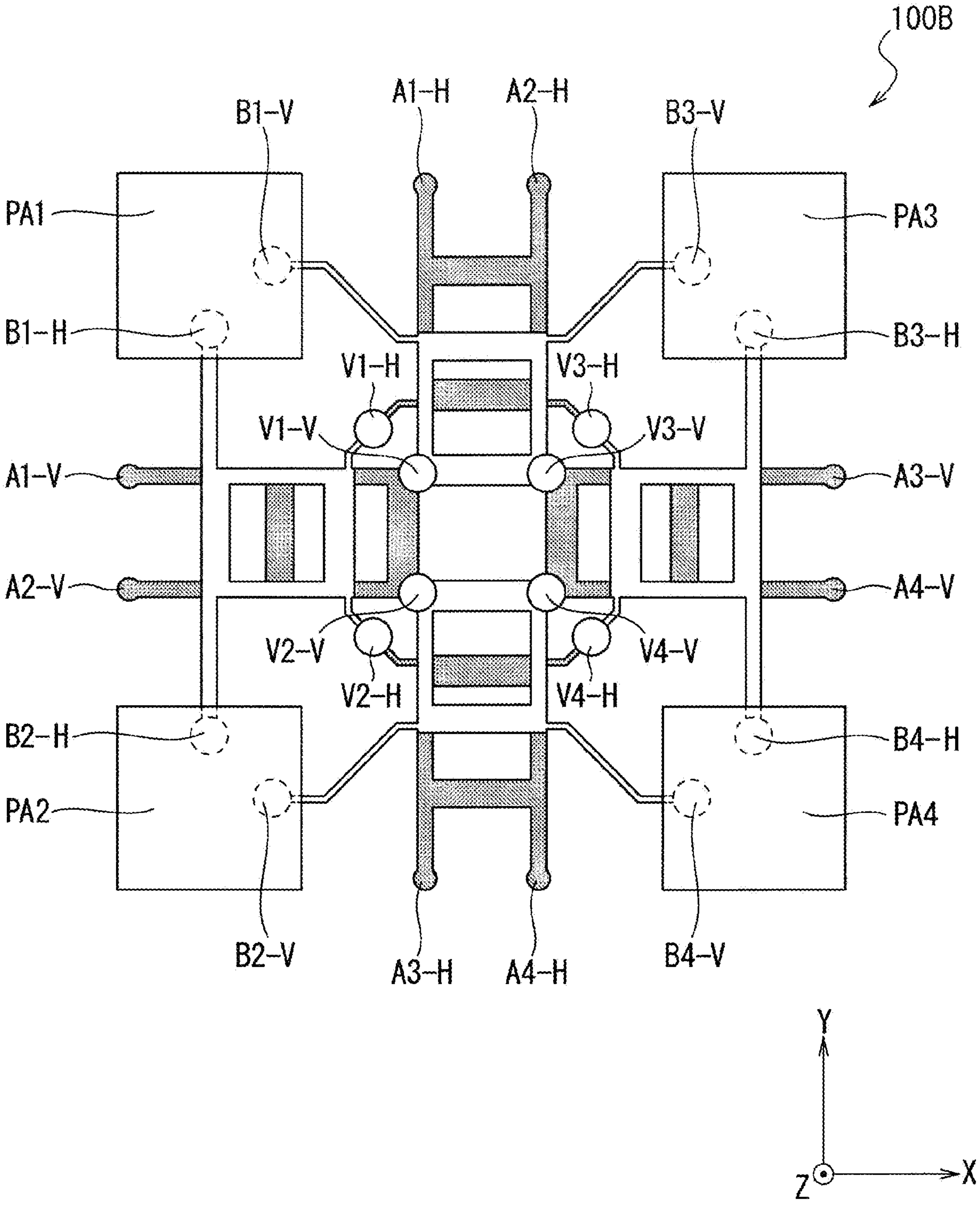
FIG. 15 is a plan view schematically illustrating an example configuration of an antenna circuit board according to a third embodiment of the present disclosure.
Figure 16:
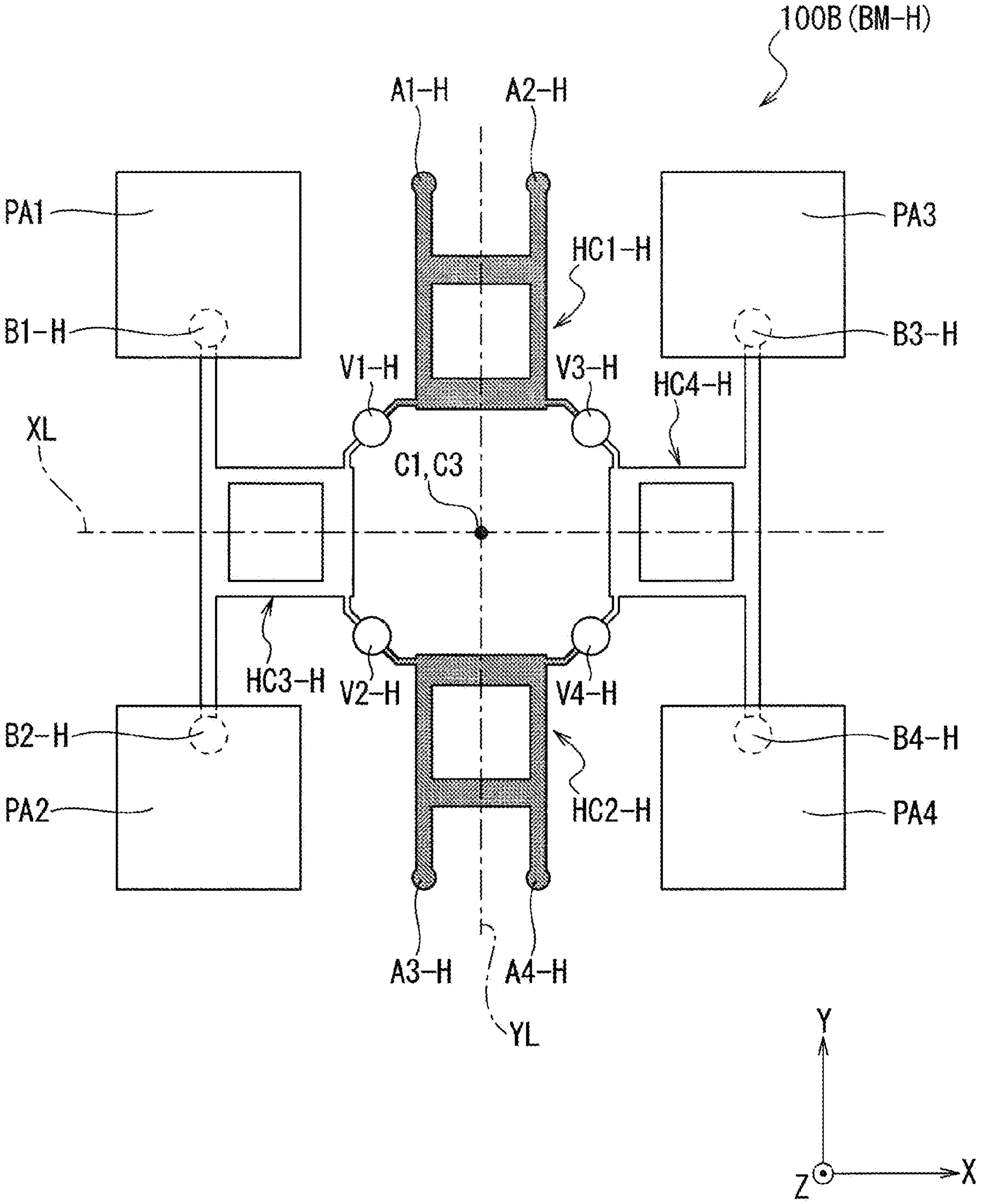
FIG. 16 is a plan view schematically illustrating an example configuration of the Butler matrix circuit for horizontal polarization in the antenna circuit board according to the third embodiment of the present disclosure.
Figure 17:
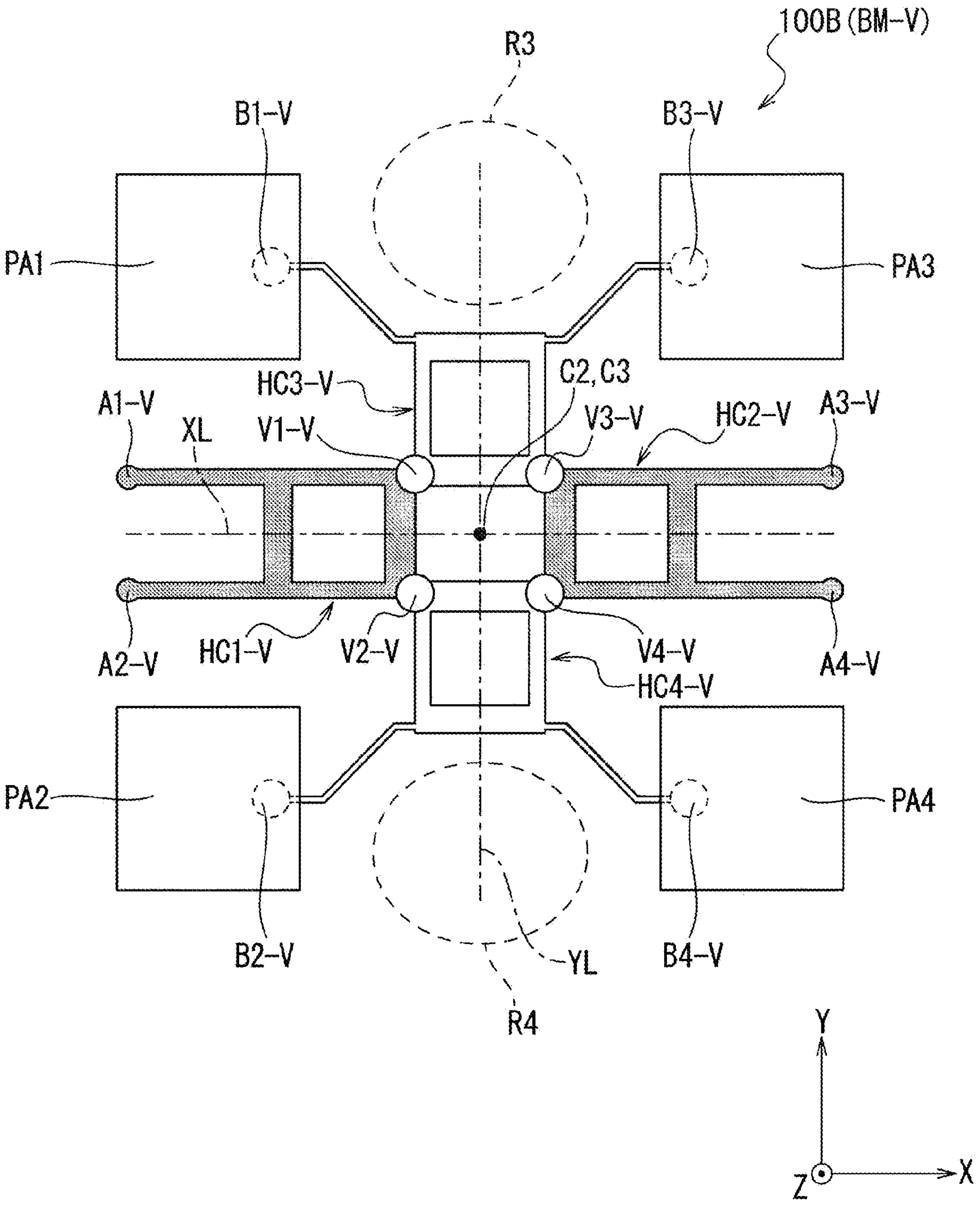
FIG. 17 is a plan view schematically illustrating an example configuration of the Butler matrix circuit for vertical polarization in the antenna circuit board according to the third embodiment of the present disclosure.
Figure 18:
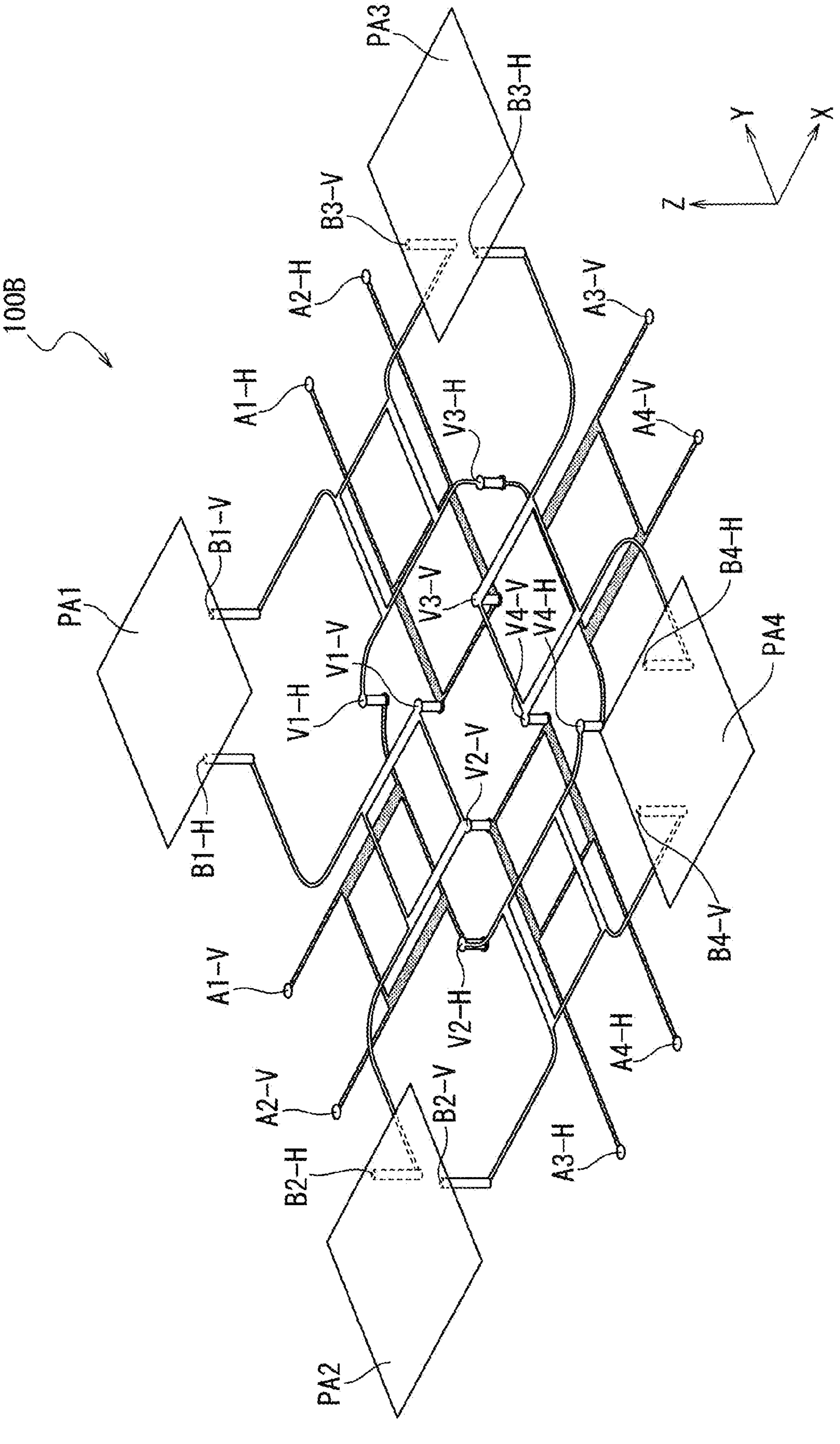
FIG. 18 is a perspective view schematically illustrating an example configuration of the antenna circuit board according to the third embodiment of the present disclosure.

FIG. 15 is a plan view schematically illustrating an example configuration of an antenna circuit board 100B according to a third embodiment of the present disclosure. FIG. 16 is a plan view schematically illustrating an example configuration of the Butler matrix circuit BM-H for horizontal polarization in the antenna circuit board 100B according to the third embodiment of the present disclosure. FIG. 17 is a plan view schematically illustrating an example configuration of the Butler matrix circuit BM-V for vertical polarization in the antenna circuit board 100B according to the third embodiment of the present disclosure. FIG. 18 is a perspective view schematically illustrating an example configuration of the antenna circuit board 100B according to the third embodiment of the present disclosure.

As depicted in FIGS. 15 to 18, the antenna circuit board 100B according to the third embodiment is configured such that the hybrid couplers HC1-V, HC2-V, HC3-V, HC4-V in the Butler matrix circuit BM-V are disposed close to the center position C2 as compared to the antenna circuit board 100A according to the second embodiment.

For example, the hybrid coupler HC1-V is disposed at a position shifted from the hybrid coupler HC3-H when viewed in plan. The hybrid coupler HC1-V is shifted toward the center position C2. Similarly, the hybrid coupler HC2-V is disposed at a position shifted from the hybrid coupler HC4-H when viewed in plan. The hybrid coupler HC2-V is shifted toward the center position C2. The hybrid coupler HC3-V is disposed at a position shifted from the hybrid coupler HC1-H when viewed in plan. The hybrid coupler HC3-V is shifted toward the center position C2. The hybrid coupler HC4-V is disposed at a position shifted from the hybrid coupler HC2-H when viewed in plan. The hybrid coupler HC4-V is shifted toward the center position C2.

Consequently, the Butler matrix circuit BM-V for vertical polarization is configured such that spaces R3 and R4 are created outside the hybrid couplers HC3-V and HC4-V (i.e., between the patch antennas PA1 and PA3 and between the patch antennas PA1 and PA4). The antenna circuit board 100B is capable of reducing its area by the areas of the spaces R3 and R4. Further, the antenna circuit board 100B may be configured such that, for example, circuits and wires other than those of the hybrid couplers are disposed in the spaces R3 and R4.

Fourth Embodiment

The first to third embodiments have been described above on the assumption that the Butler matrix circuits BM-V and BM-H have the same resonance frequency, and that the Butler matrix circuit BM-V is used for vertical polarization while the Butler matrix circuit BM-H is used for horizontal polarization.

However, in the present disclosure, the two Butler matrix circuits BM may have different resonance frequencies. For example, in the embodiments of the present disclosure, one of the two Butler matrix circuits BM may be used as a Butler matrix circuit BM-LF for low frequency (an example of the "first Butler matrix circuit" according to the present disclosure), and the other Butler matrix circuit BM may be used as a Butler matrix circuit BM-HF for high frequency (an example of the "second Butler matrix circuit" according to the present disclosure).

Figure 19:
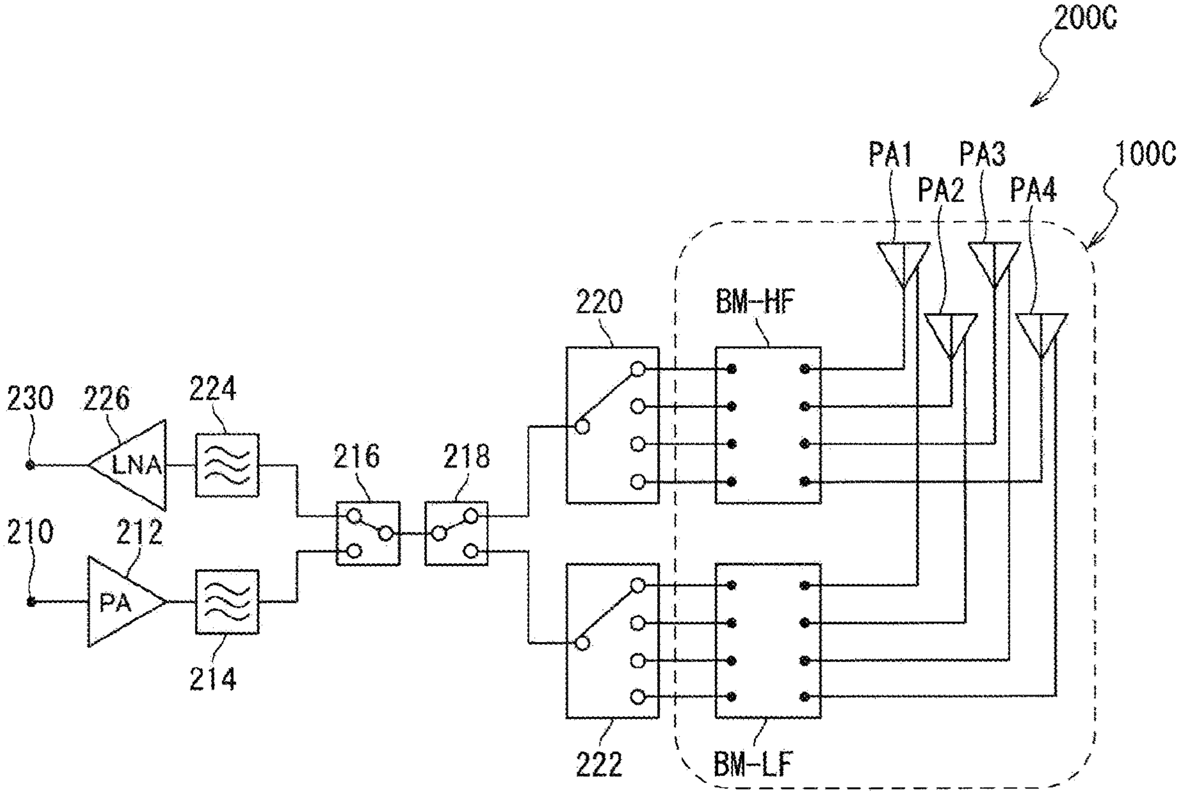
FIG. 19 is a diagram illustrating an example configuration of a phased array antenna device according to a fourth embodiment of the present disclosure.

FIG. 19 is a diagram illustrating an example configuration of the phased array antenna device 200C according to a fourth embodiment of the present disclosure. The phased array antenna device 200C is an example of the antenna device according to the present disclosure. As depicted in FIG. 19, the phased array antenna device 200C includes an antenna circuit board 100C, an input terminal 210 for inputting a signal to the antenna circuit board 100C, and an output terminal 230 for outputting a signal from the antenna circuit board 100C. Further, the phased array antenna device 200 includes a power amplifier (PA) 212, filters 214 and 224, single-pole double-throw (SPDT) switches 216 and 218, single-pole quadruple-throw (SP4T) switches 220 and 222, and a low-noise amplifier (LNA) 226. These components are disposed in a transmission line that connects the input terminal 210 (or the output terminal 230) to the antenna circuit board 100C.

The power amplifier 212 amplifies a signal inputted to the input terminal 210, and outputs the amplified signal to the filter 214. The filters 214 and 224 pass only signals within a specific range of frequencies. The signals within the specific range of frequencies may be, for example, millimeter wave band signals. The single-pole double-throw switch 216 switches connection between the single-pole double-throw switch 218 and either the filter 214 or the filter 224. The single-pole double-throw switch 218 switches connection between the single-pole double-throw switch 216 and either the single-pole quadruple-throw switch 220 or the single-pole quadruple-throw switch 222.

The single-pole quadruple-throw switch 220 switches connection between the single-pole double-throw switch 218 and the four input terminals of the Butler matrix circuit BM-HF. The single-pole quadruple-throw switch 222 switches connection between the single-pole double-throw switch 218 and the four input terminals of the Butler matrix circuit BM-LF. The low-noise amplifier 226 amplifies a received millimeter wave band signal while inhibiting the addition of noise.

The antenna circuit board 100C includes four patch antennas PA1, PA2, PA3, and PA4 which are disposed apart from each other and two Butler matrix circuits. The two Butler matrix circuits included in the antenna circuit board 100C have different resonance frequencies. The antenna circuit board 100C includes the two Butler matrix circuits, namely, the Butler matrix circuit BM-HF for high frequency and the Butler matrix circuit BM-LF for low frequency. Each of the two Butler matrix circuits BM-HF and BM-LF is of a 4-input 4-output type.

In the Butler matrix circuit BM-HF, the four input terminals are respectively connected to four terminals of the single-pole quadruple-throw switch, and the four output terminals are respectively connected to the patch antennas PA1, PA2, PA3, and PA4. Similarly, in the Butler matrix circuit BM-LF, the four input terminals are respectively connected to four terminals of the single-pole quadruple-throw switch 130, and the four output terminals are respectively connected to the patch antennas PA1, PA2, PA3, and PA4.

Figure 20:
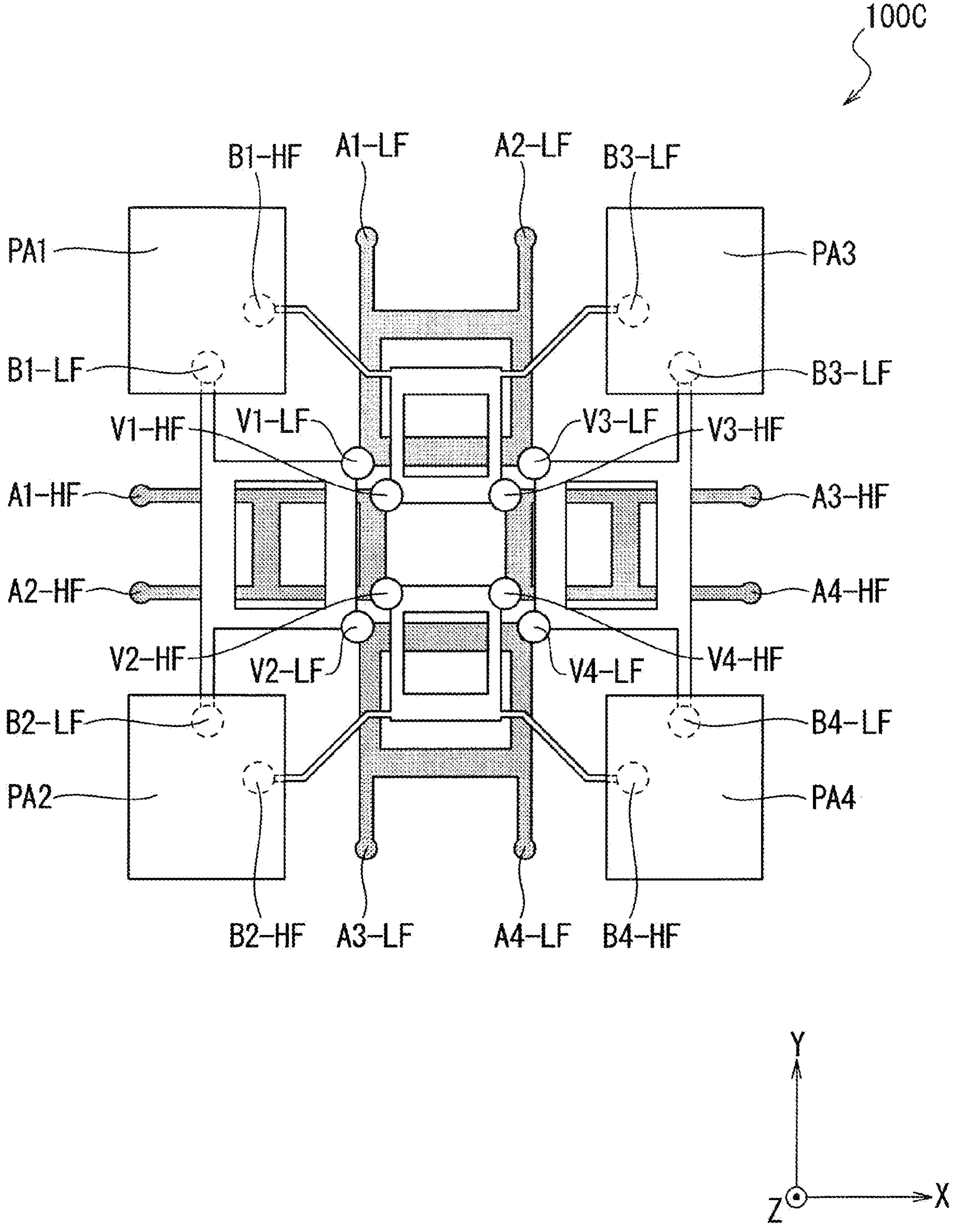
FIG. 20 is a plan view schematically illustrating an example configuration of an antenna circuit board according to the fourth embodiment of the present disclosure.
Figure 21:
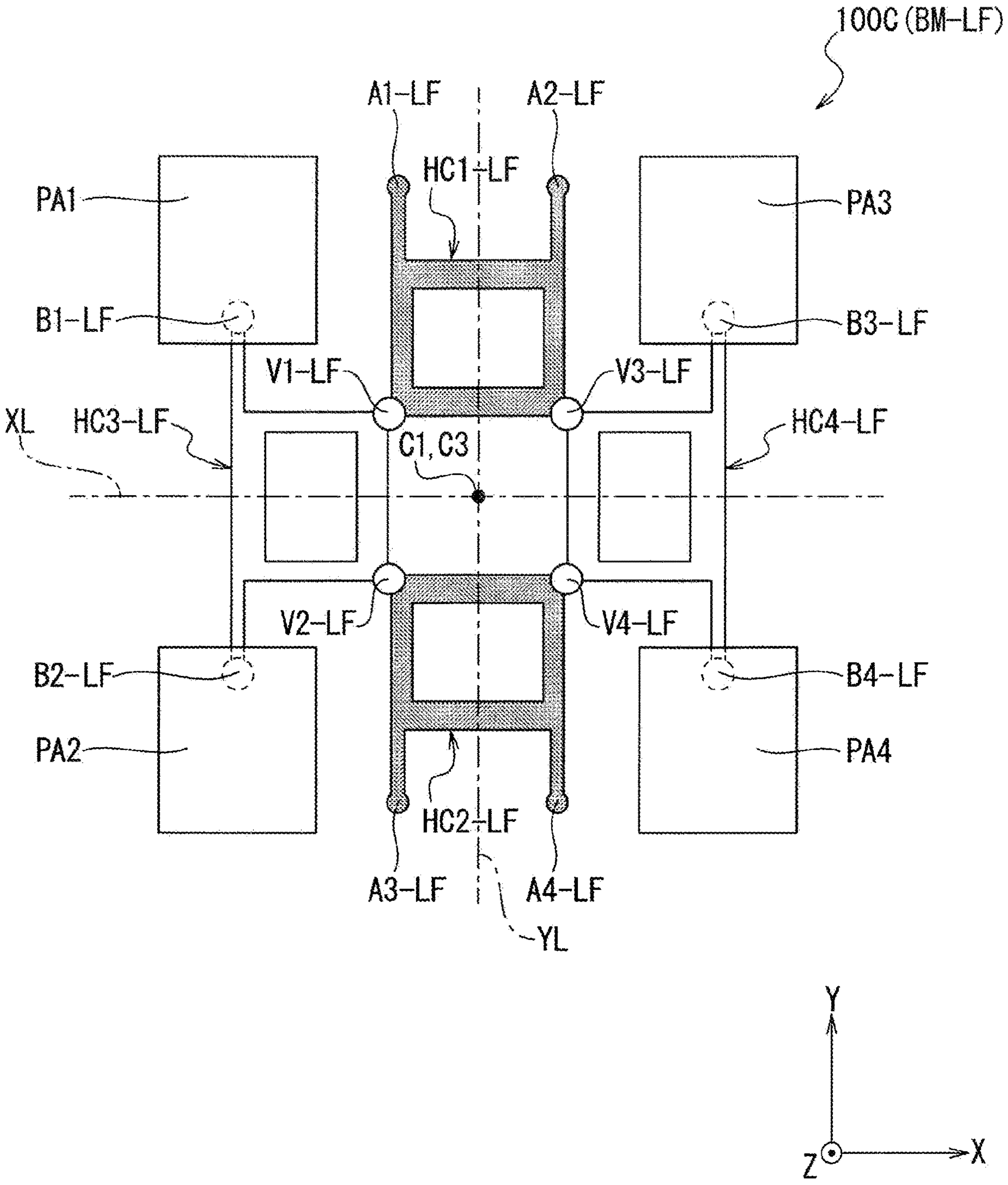
FIG. 21 is a plan view schematically illustrating an example configuration of a Butler matrix circuit for low frequency in the antenna circuit board according to the fourth embodiment of the present disclosure.
Figure 22:
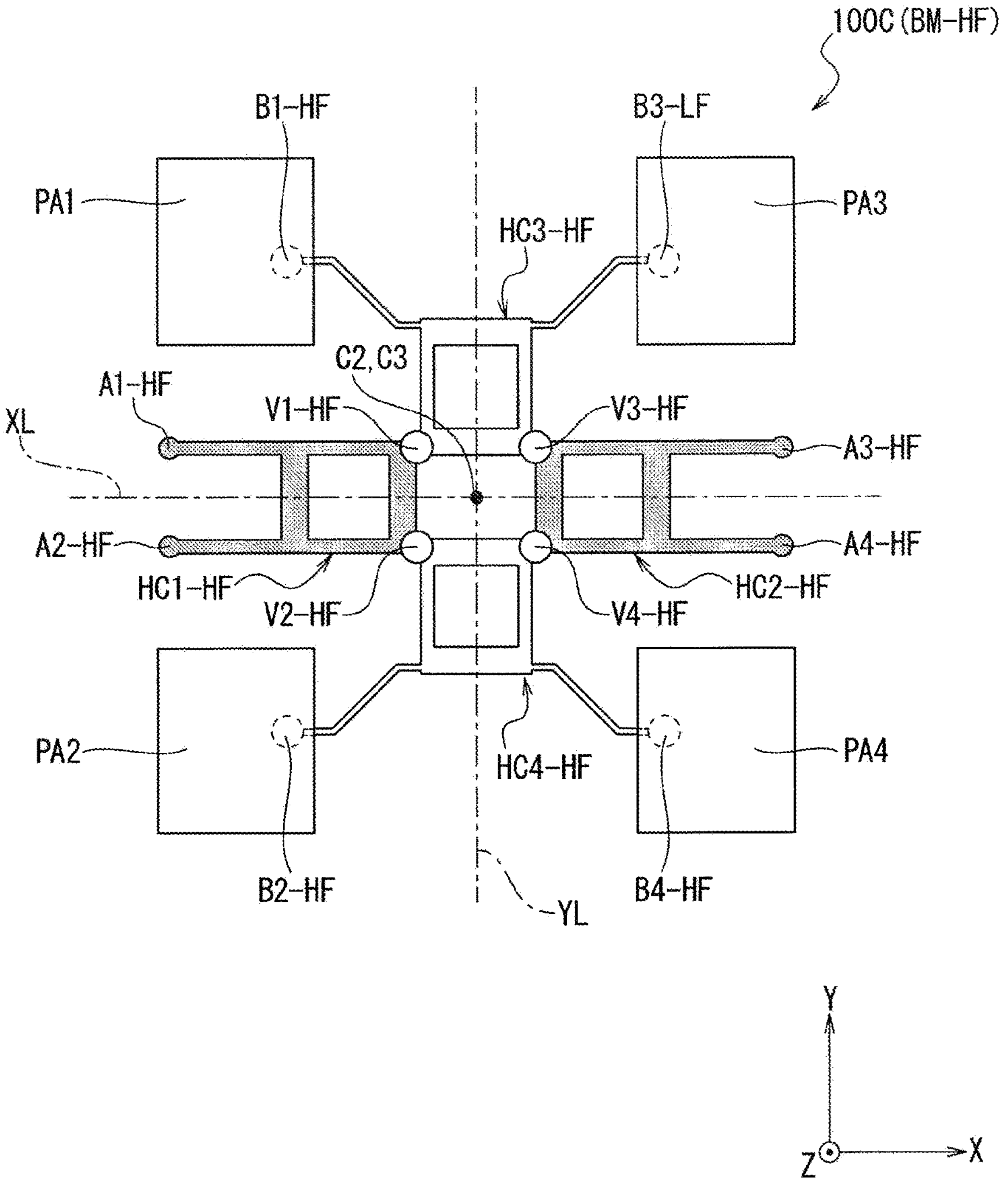
FIG. 22 is a plan view schematically illustrating an example configuration of a Butler matrix circuit for high frequency in the antenna circuit board according to the fourth embodiment of the present disclosure.
Figure 23:
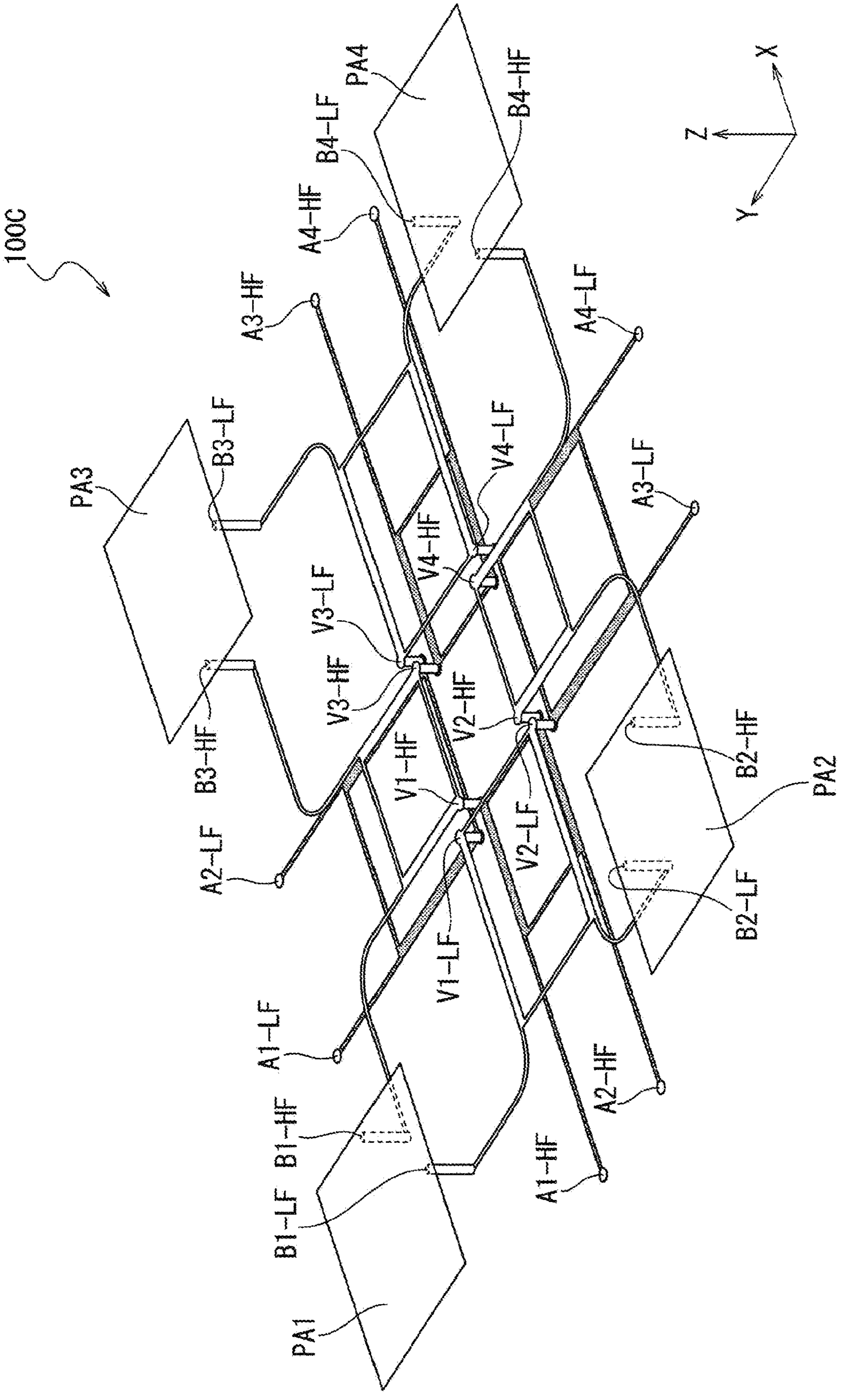
FIG. 23 is a perspective view schematically illustrating an example configuration of the antenna circuit board according to the fourth embodiment of the present disclosure.

FIG. 20 is a plan view schematically illustrating an example configuration of the antenna circuit board 100C according to the fourth embodiment of the present disclosure. FIG. 21 is a plan view schematically illustrating an example configuration of the Butler matrix circuit BM-LF for low frequency in the antenna circuit board 100C according to the fourth embodiment of the present disclosure. FIG. 22 is a plan view schematically illustrating an example configuration of the Butler matrix circuit BM-HF for high frequency in the antenna circuit board 100C according to the fourth embodiment of the present disclosure. FIG. 23 is a perspective view schematically illustrating an example configuration of the antenna circuit board 100C according to the fourth embodiment of the present disclosure.

As depicted in FIGS. 20, 21, and 23, the Butler matrix circuit BM-LF for low frequency includes four input terminals A1-LF, A2-LF, A3-LF, and A4-LF (examples of the "first terminals" according to the present disclosure), a hybrid coupler HC1-LF connected to the input terminals A1-LF and A2-LF, a hybrid coupler HC2-LF connected to the input terminals A3-LF and A4-LF, a hybrid coupler HC3-LF connected to output terminals B1-LF and B2-LF, and a hybrid coupler HC4-LF connected to output terminals B3-LF and B4-LF. The hybrid couplers HC1-LF and HC2-LF are examples of the "first hybrid couplers" according to the present disclosure. The hybrid couplers HC3-LF and HC4-LF are examples of the "second hybrid couplers" according to the present disclosure.

The output terminal B1-LF is connected to the patch antenna PA1. The output terminal B2-LF is connected to the patch antenna PA2. The output terminal B3-LF is connected to the patch antenna PA3. The output terminal B4-LF is connected to the patch antenna PA4. The output terminals B1-LF, B2-LF, B3-LF, B4-LF are examples of the "first feed points" according to the present disclosure.

As depicted in FIGS. 20, 22, and 23, the Butler matrix circuit BM-HF for high frequency includes four input terminals A1-HF, A2-HF, A3-HF, and A4-HF (examples of the "second terminals" according to the present disclosure), a hybrid coupler HC1-HF connected to the input terminals A1-HF and A2-HF, a hybrid coupler HC2-HF connected to the input terminals A3-HF and A4-HF, a hybrid coupler HC3-HF connected to output terminals B1-HF and B3-HF, and a hybrid coupler HC4-HF connected to output terminals B2-HF and B4-HF. The hybrid couplers HC1-HF and HC2-HF are examples of the "third hybrid couplers" according to the present disclosure. The hybrid couplers HC3-HF and HC4-HF are examples of the "fourth hybrid couplers" according to the present disclosure.

The output terminal B1-HF is connected to the patch antenna PA1. The output terminal B2-HF is connected to the patch antenna PA2. The output terminal B3-HF is connected to the patch antenna PA3. The output terminal B4-HF is connected to the patch antenna PA4. The output terminals B1-HF, B2-HF, B3-HF, and B4-HF are examples of the "second feed points" according to the present disclosure.

As depicted in FIGS. 20 to 23, the Butler matrix circuit BM-LF for low frequency and the Butler matrix circuit BM-HF for high frequency are both configured such that the hybrid couplers positioned toward the input terminals include a first one of the conductive layers, and that the hybrid couplers positioned toward the output terminals include a second one of the conductive layers. The hybrid couplers HC1-LF, HC2-LF, HC1-HF, and HC2-HF which are positioned toward the input terminals each include the first one of the conductive layers. The hybrid couplers HC3-LF, HC4-LF, HC3-HF, and HC4-HF which are positioned toward the output terminals each include the second one of the conductive layers.

The antenna circuit board 100C has the same layer structure as the antenna circuit board 100A depicted, for example, in FIG. 14. In the antenna circuit board 100C, the first one of the conductive layers is the first conductive layer 2 depicted in FIG. 14, and the second one of the conductive layers is the second conductive layer 3 depicted in FIG. 14.

As depicted in FIG. 21, in the Butler matrix circuit BM-LF for low frequency, the hybrid coupler HC1-LF and the hybrid coupler HC3-LF are connected to each other through a via V1-LF. The hybrid coupler HC1-LF and the hybrid coupler HC4-LF are connected to each other through a via V3-LF. The hybrid coupler HC2-LF and the hybrid coupler HC3-LF are connected to each other through a via V2-LF. The hybrid coupler HC2-LF and the hybrid coupler HC4-LF are connected to each other through a via V4-LF.

As depicted in FIG. 22, in the Butler matrix circuit BM-HF for high frequency, the hybrid coupler HC1-HF and the hybrid coupler HC3-HF are connected to each other through a via V1-HF. The hybrid coupler HC1-HF and the hybrid coupler HC4-HF are connected to each other through a via V2-HF. The hybrid coupler HC2-HF and the hybrid coupler HC3-HF are connected to each other through a via V3-HF. The hybrid coupler HC2-HF and the hybrid coupler HC4-HF are connected to each other through the via V3-HF.

The antenna circuit board 100C is able to use the output terminals B1-LF, B2-LF, B3-LF, and B4-LF as the feed points for low frequencies in millimeter wave band and use the output terminals B1-HF, B2-HF, B3-HF, and B4-HF as the feed points for high frequencies in the millimeter wave band. The antenna circuit board 100C is capable of handling two different frequencies in the millimeter wave band, and is thus able to efficiently transmit the millimeter wave band signals.

Fifth Embodiment

The first to fifth embodiments have been described above on the assumption that two Butler matrix circuits are formed by using two conductive layers. However, in the embodiments of the present disclosure, the number of conductive layers forming the two Butler matrix circuits is not limited to two. The two Butler matrix circuits may alternatively be formed by using one conductive layer.

Figure 24:
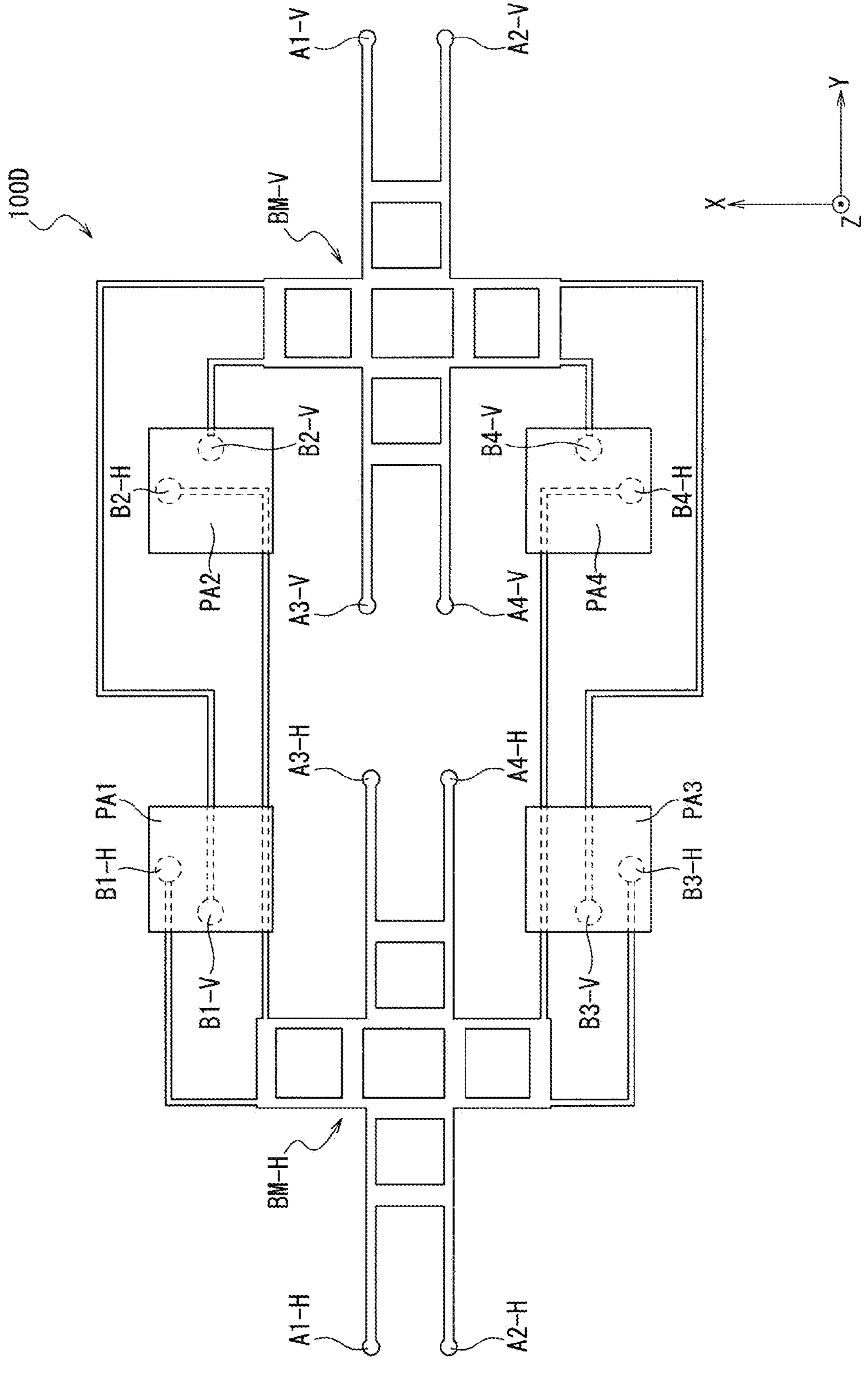
FIG. 24 is a plan view illustrating an example configuration of an antenna circuit board according to a fifth embodiment of the present disclosure.
Figure 25:
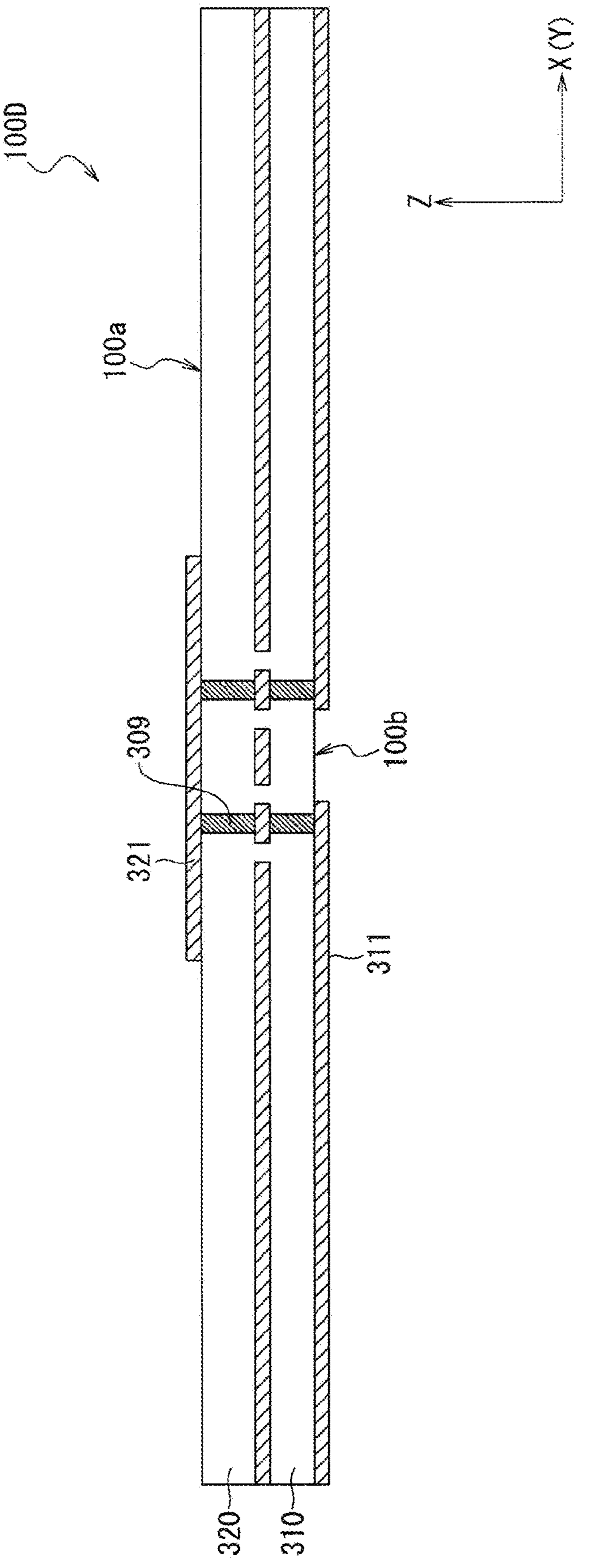
FIG. 25 is a cross-sectional view schematically illustrating an example configuration of the antenna circuit board according to the fifth embodiment of the present disclosure.

FIG. 24 is a plan view illustrating an example configuration of an antenna circuit board 100D according to a fifth embodiment of the present disclosure. FIG. 25 is a cross-sectional view schematically illustrating an example configuration of the antenna circuit board 100D according to the fifth embodiment of the present disclosure. As depicted in FIG. 24, the antenna circuit board 100D is configured such that the Butler matrix circuit BM-H for horizontal polarization and the Butler matrix circuit BM-V for vertical polarization are arranged side by side when viewed in plan. The Butler matrix circuit BM-H and the Butler matrix circuit BM-V have the same conductive layer (e.g., the first conductive layer).

FIG. 25 is a cross-sectional view schematically illustrating an example configuration of the antenna circuit board 100D according to the fifth embodiment of the present disclosure. The antenna circuit board 100D includes an organic substrate, a build-up substrate, a ceramic substrate, or other appropriate substrates that provide multilayer wiring. Further, the antenna circuit board 100D may include a microstripline.

As depicted in FIG. 25, the antenna circuit board 100D has the front surface 100*a* and the back surface 100*b*. The back surface 100*b* is positioned opposite the front surface 100*a*. A conductive layer 311 is formed on the back surface 100*b* while a conductive layer 321 is formed on the front surface 100*a*. Further, insulating layers 310 and 320 are disposed between the front surface 100*a* and the back surface 100*b*. The conductive layers 311 and 321 are connected to each other by a connection wire 309.

The conductive layers 311 and 321 each include metal such as Cu or a Cu alloy. The connection wire 309 is formed, for example, by combining a via and a relay wire. The via is disposed in the Z-axis direction. The relay wire is disposed in the horizontal direction (e.g., X- and Y-axis directions). The relay wire includes a conductive layer that is disposed between the insulating layers 310 and 320.

In the antenna circuit board 100D, the four hybrid couplers included in the Butler matrix circuit BM-H and the four hybrid couplers included in the Butler matrix circuit BM-V each include the conductive layer 311.

The antenna circuit board 100D has a larger substrate area than that of the antenna circuit board 100 according to the first embodiment. However, the antenna circuit board 100D is capable of handling horizontal polarization and vertical polarization of the millimeter wave band, and is thus able to efficiently transmit the millimeter wave band signals.

Alternative Embodiments

While the present disclosure has been described in conjunction with the first to fifth embodiments, it is to be understood that the present disclosure is not limited by statements and drawings included in the present disclosure. It will be obvious from the present disclosure that various alternative embodiments, examples, and operational technologies may be contemplated by persons skilled in the art. The present technology obviously includes, for example, various embodiments not described in this specification. Modifications may be made at least by omitting, replacing, or changing the above-described components in various manners without departing from the spirit of the first to fifth embodiments described above. The first to fifth embodiments may be combined as appropriate. Further, advantages described in this specification are merely illustrative and not restrictive. The present disclosure can additionally provide advantages other than those described in this specification.

It should be noted that the present disclosure may also adopt the following configurations.

(1)

An antenna device including:

plural antennas that are disposed apart from each other;

a first Butler matrix circuit that is connected to each of the plural antennas; and a second Butler matrix circuit that is connected to each of the plural antennas, in which each of the plural antennas has a first feed point and a second feed point, the first feed point being connected to the first Butler matrix circuit, the second feed point being connected to the second Butler matrix circuit, the first and second feed points being disposed apart from each other.

(2)

The antenna device as described in (1) above, in which the first Butler matrix circuit and the second Butler matrix circuit are disposed to overlap with each other when viewed in plan.

(3)

The antenna device as described in (1) or (2) above, in which the first Butler matrix circuit includes plural first terminals, a first hybrid coupler that is connected to the plural first terminals, and a second hybrid coupler that is connected to the first hybrid coupler and to the plural first feed points, and the second Butler matrix circuit includes plural second terminals, a third hybrid coupler that is connected to the plural second terminals, and a fourth hybrid coupler that is connected to the third hybrid coupler and to the plural second feed points.

(4)

The antenna device as described in (3) above, further including:

a circuit board that has a first surface and a second surface, the second surface being positioned opposite the first surface, in which the circuit board includes a first conductive layer that is positioned between the first surface and the second surface, a second conductive layer that is positioned between the first conductive layer and the first surface, and a third conductive layer that is positioned opposite the first conductive layer with the second conductive layer sandwiched between the first conductive layer and the third conductive layer, the first hybrid coupler and the second hybrid coupler include the first conductive layer, the third hybrid coupler and the fourth hybrid coupler include the second conductive layer, and the plural antennas include the third conductive layer.

(5)

The antenna device as described in (3) above, further including:

a circuit board that has a first surface and a second surface, the second surface being positioned opposite the first surface, in which the circuit board includes a first conductive layer that is positioned between the first surface and the second surface, a second conductive layer that is positioned between the first conductive layer and the first surface, and a third conductive layer that is positioned opposite the first conductive layer with the second conductive layer sandwiched between the first conductive layer and the third conductive layer, the first hybrid coupler and the third hybrid coupler include one of the first and second conductive layers, the second hybrid coupler and the fourth hybrid coupler include the other one of the first and second conductive layers, and the plural antennas include the third conductive layer.

(6)

The antenna device as described in (4) or (5) above, in which the first hybrid coupler and the third hybrid coupler have a same shape and a same line length.

(7)

The antenna device as described in any one of (4) to (6) above, in which the second hybrid coupler and the fourth hybrid coupler have a same shape and a same line length.

(8)

The antenna device as described in any one of (4) to (7) above, in which a first line between a corresponding one of the first terminals and the first hybrid coupler and a second line between a corresponding one of the second terminals and the third hybrid coupler have a same shape and a same line length.

(9)

The antenna device as described in any one of (4) to (8) above, in which a third line between the second hybrid coupler and a corresponding one of the first feed points and a fourth line between the fourth hybrid coupler and a corresponding one of the second feed points have a same shape and a same line length.

(10)

The antenna device as described in any one of (1) to (9) above, in which a center position as viewed in plan of an antenna group including the plural antennas, a center position as viewed in plan of the first Butler matrix circuit, and a center position as viewed in plan of the second Butler matrix circuit coincide with each other.

REFERENCE SIGNS LIST

2: First conductive layer
3: Second conductive layer
4: Third conductive layer
5: Fourth conductive layer
9A, 9B, 9C, 9D, 309: Connection wire
10: First organic substrate
20: First stripline
30: Second stripline
40: Second organic substrate
50: Wiring substrate
50*a*, 100*a*: Front surface
50*b*, 100*b*: Back surface
51: Terminal section
60: Connection parts
61, 62, 63, 64, 65, 66, 67, 68, 69: Electronic part
70: Another substrate
100, 100A, 100B, 100C, 100D: Antenna circuit board
110: Input terminal
112, 212: Power amplifier
114: Single-pole double-throw switch
116, 132: Bandpass filter
118, 130: Single-pole double-throw switch
120, 134, 226: Low-noise amplifier
122, 136, 230: Output terminal
200, 200C: Phased array antenna device
210: Input terminal
214, 224: Filter
216, 218: Single-pole double-throw switch
220, 222: Single-pole quadruple-throw switch
310, 320: Insulating layer
320, 321: Conductive layer
a1 to a4, A1-H to A4-H, A1-HF to A4-HF, A1-LF to A4-LF, A1-V to A4-V: Input terminal
b1 to b4, B1-H to B4-H, B1-HF to B4-HF, B1-LF to B4-LF, B1-V to B4-V: Input terminal
BM, BM-H, BM-HF, BM-LF, BM-V: Butler matrix circuit
C1, C2, C3: Center position
HC1 to HC4, HC1-H to HC4-H, HC1-HF to HC4-HF, HC1-LF to HC4-LF, HC1-V to HC4-V: Hybrid coupler
L11 to L18, L21 to L28: Line
PA1, PA2, PA3, PA4: Patch antenna
PS1, PS2: phase shifter
R3, R4: Space
TL: Transmission line
V1-H to V4-H, V1-HF to V4-HF, V1-LF to V4-LF, V1-V to V4-V, V11 to V14: Via
XL, YL: Virtual line

The invention claimed is:

1. An antenna device, comprising:

a plurality of antennas that includes a plurality of first feed points and a plurality of second feed points, wherein a first antenna of the plurality of antennas is apart from a second antenna of the plurality of antennas, and the plurality of first feed points is apart from the plurality of second feed points;

a first Butler matrix circuit connected to each antenna of the plurality of antennas,
wherein the first Butler matrix circuit includes:
a plurality of first terminals;
a first hybrid coupler connected to the plurality of first terminals; and
a second hybrid coupler connected to the first hybrid coupler and the plurality of first feed points;
a second Butler matrix circuit connected to each antenna of the plurality of antennas, wherein
the second Butler matrix circuit includes:
a plurality of second terminals;
a third hybrid coupler connected to the plurality of second terminals; and
a fourth hybrid coupler connected to the third hybrid coupler and the plurality of second feed points; and
a circuit board that includes:
a first surface;
a second surface opposite to the first surface;
a first conductive layer between the first surface and the second surface;
a second conductive layer between the first conductive layer and the first surface; and
a third conductive layer opposite to the first conductive layer, wherein
the second conductive layer is between the first conductive layer and the third conductive layer,
each of the first hybrid coupler and the second hybrid coupler includes the first conductive layer,
each of the third hybrid coupler and the fourth hybrid coupler includes the second conductive layer, and
each of the plurality of antennas includes the third conductive layer.

2. The antenna device according to claim 1, wherein the first Butler matrix circuit overlaps with the second Butler matrix circuit in a plan view.

3. The antenna device according to claim 1, wherein the first hybrid coupler and the third hybrid coupler have a same shape and a same line length.

4. The antenna device according to claim 1, wherein the second hybrid coupler and the fourth hybrid coupler have a same shape and a same line length.

5. The antenna device according to claim 1, further comprising:
a first line between a first terminal of the plurality of first terminals and the first hybrid coupler, and
a second line between a second terminal of the plurality of second terminals and the third hybrid coupler,
wherein the first line and the second line have a same shape and a same line length.

6. The antenna device according to claim 1, further comprising:
a third line between the second hybrid coupler and a first feed point of the plurality of first feed points; and
a fourth line between the fourth hybrid coupler and a second feed point of the plurality of second feed points,
wherein the third line and the fourth line have a same shape and a same line length.

7. The antenna device according to claim 1, wherein the plurality of antennas corresponds to an antenna group,
a center position as viewed in plan of the antenna group coincides with a center position as viewed in plan of the first Butler matrix circuit, and
the center position as viewed in plan of the first Butler matrix circuit coincides with a center position as viewed in plan of the second Butler matrix circuit.

8. An antenna device, comprising:
a plurality of antennas that includes a plurality of first feed points and a plurality of second feed points, wherein
a first antenna of the plurality of antennas is apart from a second antenna of the plurality of antennas, and
the plurality of first feed points is apart from the plurality of second feed points;
a first Butler matrix circuit connected to each antenna of the plurality of antennas,
wherein the first Butler matrix circuit includes:
a plurality of first terminals;
a first hybrid coupler connected to the plurality of first terminals; and
a second hybrid coupler connected to the first hybrid coupler and the plurality of first feed points;
a second Butler matrix circuit connected to each antenna of the plurality of antennas, wherein
the second Butler matrix circuit includes:
a plurality of second terminals;
a third hybrid coupler connected to the plurality of second terminals; and
a fourth hybrid coupler connected to the third hybrid coupler and the plurality of second feed points; and
a circuit board that includes:
a first surface;
a second surface opposite to the first surface;
a first conductive layer between the first surface and the second surface;
a second conductive layer between the first conductive layer and the first surface; and
a third conductive layer opposite to the first conductive layer, wherein
the second conductive layer is between the first conductive layer and the third conductive layer,
each of the first hybrid coupler and the third hybrid coupler includes the first conductive layer,
each of the second hybrid coupler and the fourth hybrid coupler includes the second conductive layer, and
each of the plurality of antennas includes the third conductive layer.

* * * * *